(12) United States Patent
Gray

(10) Patent No.: US 7,305,417 B2
(45) Date of Patent: *Dec. 4, 2007

(54) SYSTEM AND PROCESS FOR IDENTIFYING OBJECTS AND/OR POINTS NEARBY A GIVEN OBJECT OR POINT

(75) Inventor: James Gray, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 292 days.

This patent is subject to a terminal disclaimer.

(21) Appl. No.: 11/256,376

(22) Filed: Oct. 21, 2005

(65) Prior Publication Data

US 2006/0036629 A1 Feb. 16, 2006

Related U.S. Application Data

(63) Continuation of application No. 10/354,200, filed on Jan. 28, 2003, now Pat. No. 6,993,538.

(51) Int. Cl.
G06F 17/40 (2006.01)
(52) U.S. Cl. ............... 707/104.1; 707/10; 701/201; 340/990; 340/995.1
(58) Field of Classification Search ............... 707/3, 707/4, 10, 104.1; 701/201, 202, 206, 212, 701/214; 702/5; 340/988, 990, 991, 992, 340/993, 995.1, 995.14
See application file for complete search history.

(56) References Cited

U.S. PATENT DOCUMENTS 5,761,080 A * 6/1998 DeCamp et al. ............ 716/5
5,809,179 A * 9/1998 Marimont et al. .......... 382/254
5,963,956 A * 10/1999 Smartt .................... 707/104.1
5,968,109 A * 10/1999 Israni et al. ............... 701/208
6,029,173 A * 2/2000 Meek et al. ................ 707/102
6,081,803 A * 6/2000 Ashby et al. .................. 707/4
6,122,593 A * 9/2000 Friederich et al. ......... 701/202
H1997 H * 10/2001 Fleischer ....................... 702/5

(Continued)

OTHER PUBLICATIONS

Kirson, Allan M., "Route Planning System With User Selectable Preferences", Motorola, Inc. Technical Developments, vol. 13, Jul. 1991, pp. 58-59.*

(Continued)

*Primary Examiner*—Shahid A Alam
(74) *Attorney, Agent, or Firm*—Lyon & Harr, LLP; Richard T. Lyon

(57) ABSTRACT

A system and process is presented that identifies nearby objects and/or points in relation to a base object or point. An object or point is nearby if it resides within a prescribed area around the base point. The identification is based on information accessed from a database of geometric data. The identification of nearby neighbors begins by dividing the geographic system defined by said geometric data into a plurality of zones. The zone in which each object or point resides and the zones intersected by the prescribed area are determined. The nearby objects and/or points of interest are then identified by initially considering only those that are identified as residing in the zones intersected by the prescribed area. The search for nearby neighbors can be further refined by limiting the objects and/or points considered to those with locations within the lateral extent and/or within the height of the prescribed area.

10 Claims, 9 Drawing Sheets

U.S. PATENT DOCUMENTS

| | | | |
|---|---|---|---|
| 6,308,177 B1* | 10/2001 | Israni et al. | 707/100 |
| 6,321,158 B1* | 11/2001 | DeLorme et al. | 701/201 |
| 6,343,301 B1* | 1/2002 | Halt et al. | 707/203 |
| 6,415,227 B1* | 7/2002 | Lin | 701/213 |
| 6,681,231 B1* | 1/2004 | Burnett | 707/104.1 |
| 6,704,648 B1* | 3/2004 | Naik et al. | 701/208 |
| 6,944,607 B1* | 9/2005 | Zhang et al. | 707/2 |
| 7,035,869 B2* | 4/2006 | Smartt | 707/102 |

OTHER PUBLICATIONS

Nagy, George et al., "Geographic Data Processing", Computing Survey, vol. 11, No. 2, Jun. 1979, pp. 139-181.*

Szalay, Alexander S. et al., "The SDSS SkyServer—Public Access to the Sloan Digital Sky Server Data," ACMSIGMOD' 2002, Jun. 4-6, 2002, Madison, WI, pp. 1-12.*

* cited by examiner

SYSTEM AND PROCESS FOR IDENTIFYING OBJECTS AND/OR POINTS NEARBY A GIVEN OBJECT OR POINT

CROSS-REFERENCE TO RELATED APPLICATIONS

This application is a continuation of a prior application entitled "A SYSTEM AND PROCESS FOR IDENTIFYING OBJECTS AND/OR POINTS NEARBY A GIVEN OBJECT OR POINT" which was assigned Ser. No. 10/354,200 and filed Jan. 28, 2003, now U.S. Pat. No. 6,993,538.

BACKGROUND

1. Technical Field

The invention is related to systems and processes for identifying objects and/or points nearby a given object or point based on information accessed from a database of geometric data.

2. Background Art

There are in existence today large electronic databases containing information on objects associated with geometric systems. A very simple example of this is an electronic road map database. This type of database will typically contain information about the location of roads, towns and cities, and numerous other landmarks laid out in a planar geometry. In addition, the database will typically contain information about the landmarks found on the map. There are numerous software packages available, as well as sites on the Internet, where a user can access one of these electronic roadmap databases.

Another example of a large database containing geometric-type data in existence today is the Sloan Digital Sky Server (SDSS) database. This database which is accessible over the Internet using SkyServer database management applications contains astronomical information for astronomers and general science education purposes. The database will eventually contain the results of a 5-year survey of the Northern sky to about ½ arcsecond resolution using a modern ground-based telescope. It will characterize about 200M objects in 5 optical bands, and will measure the spectra of a million objects.

More particularly, raw astronomical data is gathered by the SDSS telescope at Apache Point, N. Mex., and fed through data analysis software pipelines. Imaging pipelines analyze data from the imaging camera to extract about 400 attributes for each celestial object along with a 5-color "cutout" image. The spectroscopic pipelines analyze data from the spectrographs, to extract calibrated spectra, redshifts, absorption and emission lines, and many other attributes. The result is a large high-quality catalog of the Northern sky (and of a small stripe of the Southern sky). When complete, the survey data will occupy about 40 terabytes (TB) of image data, and about 3 TB of processed data. After calibration, the pipeline output is available to the astronomers in the SDSS consortium. Then, after approximately a year, the SDSS publishes the data to the astronomy community and the public—so in 2007 all the SDSS data will be available to everyone everywhere. The first year's SDSS data is now public. It is about 80 GB containing about 14 million objects and 50 thousand spectra.

Still another example of a database containing a large amount of geometric-type data is Microsoft's TerraServer Web site which provides free public access to a vast data store of maps and aerial photographs of the United States. TerraServer is a valuable resource for researchers who want to study geography, environmental issues or archeological mysteries. TerraServer database management applications allow a user to easily navigate the enormous amount of information in the database by selecting a location on a map or entering a place name. TerraServer is operated by the Microsoft Corporation as a research project for developing advanced database technology, and was born at the Microsoft Bay Area Research Center. Maps and images for TerraServer are supplied by the U.S. Geological Survey.

One of the most common tasks required of database management programs used in large databases containing geometric data, such as the aforementioned SkyServer and TerraServer applications, is to find all objects nearby a given object or location. For example, in the context of the SkyServer database, astronomers are especially interested in galactic clustering and large-scale structure of the universe. As a result astronomers routinely ask for all objects in a certain area of the celestial sphere. In the context of an electronic road map or the TerraServer, a user often wants to know what points of interest can be found in the vicinity a particular location. It should be noted that while this problem of finding nearby objects or points of interest can be characterized in planar terms for maps (e.g., using a Cartesian scheme, or latitude and longitude, as a basis for measurement), in the case of the SkyServer search task, the search has to be performed in terms of spherical coordinates (e.g., using the equatorial coordinate system of right ascension and declination or (x,y,z) unit vector in J2000 coordinates). As the problem of finding nearby objects when spherical coordinates are involved is the more difficult task, the SkyServer example will be used in the following description of the issues involved in finding nearby object in a large database containing geometric information.

As indicated earlier, SkyServer applications and queries often need to find all objects nearby a given object in the celestial sphere. This is such a common operation that it is implemented as a series of table-valued functions that return all objects within a certain radius of a given equatorial coordinate point (right ascension and declination) or a given x,y,z unit vector in the J2000 coordinate system. In terms of the SQL relational database language used in the SkyServer application these functions are denoted as fGetNearbyObjEq and fGetNearbyObjXyz, respectively. The "Get Nearby Objects" functions first use the hierarchical triangular mesh (HTM) code to limit the scope of search, and then filter the objects identified in the search using an equation to compute the actual distance to ensure the object is within the specified distance from the object being considered.

In regard to the HTM search task, HTM processes inscribe the celestial sphere within an octahedron and project each celestial point onto the surface of this octahedron. The projection is approximately iso-area. HTM partitions the sphere into the 8 faces of an octahedron. It then hierarchically decomposes each face with a recursive sequence of triangles—so each level of the recursion divides each triangle into 4 sub-triangles as shown in FIG. 1. An HTM index number is then assigned to each point on the sphere. Most spatial queries use the HTM index to limit searches to a small set of triangles. An HTM index is built as an extension of SQL Server's B-trees. SkyServer uses a 20-deep HTM so that the individual triangles are less than 0.1 arcseconds on a side. There are basic routines to convert between the equatorial coordinates (i.e., right ascension (ra), declination (dec)) and HTM coordinates. Importantly, all the HTM IDs within a triangle, such as for example triangle 6,1,2,2, will have HTM IDs that are between that triangle and the next (e.g., between 6,1,2,2 and 6,1,2,3). So, when the HTM IDs are mapped into a B-tree index they provide a quick index for all the objects within a given triangle. For example, when it is desired to know what objects are nearby a certain object, or it is desired to know all the objects in a certain area, the fGetNearestObjEq(1,1,1) function returns the nearest object within one arcminute of equatorial coordinate (1°, 1°).

In regard to the aforementioned filtering task, this process eliminates any objects identified in the HTM search that are determined to be outside the prescribed distance from the object or location under consideration. The actual distance θ in degrees between the object or location under consideration (which is known to be at point x,y,z) and an object identified in the search (i.e., object o with celestial coordinates o.cx, o.cy, o.cz) are computed using the following equation:

$$\sin(\theta/2) = |\vec{o.xyz} - \vec{xyz}|/2 \qquad (1)$$

as shown by the geometric relations depicted in FIG. 2. Thus, $$\theta = \text{degrees}(2 \times a\sin(\text{sqrt}((o.cx-x)^2+(o.cy-y)^2+(o.cz-z)^2))/2)). \qquad (2)$$

Some queries want to compare each of several hundred million objects with all their neighbors. Searchers for gravitational lenses and for clusters are examples of such queries. To speed these queries the SkyServer application precomputes a Neighbors Table, which for each object lists all its neighbors within 30 arcseconds along with summary attributes. This table averages about 9 neighbors per object; but, some objects have hundreds of neighbors and some have none.

Computing the neighbors table using the fGetNearbyObjectsXyz( ) function can take a long time: on the fifteen million object SDSS early data release, the computation took 56 hours—or about 74 objects per second. Fortunately, the computation was done only a few times in the load process and then used many times in queries. But, it was obvious that some speedup will be needed as the SDSS database grows twenty-fold over the next 3 years. Indeed, with the SDSS Data Release 1 (DR1), the database is about to grow six-fold so the naive computation would take about 2 weeks on a dual 800 MHz Xeon processor with 2 GB ram and 12 disks with 150 MB/s bandwidth. Using that system, the full dataset would take about 2 months to compute. All subsequent measurements reported here are performed on an even slower computer: a 722 MHz Pentium III with 0.5 GB of ram and 1 disk with 10 MB/s of IO bandwidth.

The basic problem is that SQL can evaluate equation (2) at the rate of about 170,000 records per second (5.6 μs per row), while the HTM functions run at about 170 records per second (5.9 ms per row to return the nearest object.) This is a 1,000:1 performance difference. The high costs of the HTM functions is a combination of the HTM procedures, the expensive linkage to SQL via external stored procedures (a string interface), and the use of table-valued functions. It appears, based on preliminary timing tests that the HTM code uses about 3 ms and that the other costs (linkage, string conversion, and table-valued function) are in the range of 2 ms.

It is noted, however, that the foregoing computation is parallel and inherently CPU-bound. In other words, each object's neighbors can be computed independently. Therefore, the computation could be accelerated by using multiple processors. For example, a 7-node processor farm could do the 2-week DR1 job in 2 days. While this solution is viable, it is not very efficient in that it requires the use of multiple processors and does nothing to reduce the overall processing costs. It makes more sense to solve the problem using a better process on a single processor. This is a goal of the present invention, as will be described in the sections to follow.

The issues involved with finding nearby objects when planar coordinates are involved are identical, although typically a regional quadtree approach is taken to limit the scope of search where the quadtree IDs are mapped into a B-tree to provide a quick index for all the objects within a given block. This is as opposed to the HTM approach used for geometric data in spherical coordinates. In addition, the distance computations are somewhat simpler in the filtering stage for the planar data case.

SUMMARY

The present invention is directed in one embodiment toward a system and process for identifying nearby neighbor objects and/or points of interest in relation to a user-specified base point. An object or point is considered a nearby neighbor if it resides within a search area around the base point. The identification is made based on information accessed from a database of geometric data which includes the location of the objects and/or points. Generally, the identification of nearby neighbors begins by dividing the geographic system defined by the geometric data into a plurality of zones. Then, the zone in which each object or point resides is determined, as well as what zones are intersected by the search area. Based on this knowledge, the nearby neighbor objects and/or points of interest are identified by initially considering only those objects and/or points that are identified as residing in the zones intersected by the search area. The search for nearby neighbors can be further refined by limiting the objects and/or points considered to those with locations within the lateral extent of the search area. The search can be even further refined by considering only those objects and/or points residing within the height of the search area.

More particularly, the identification process involves first dividing the geographic system defined by said geometric data into a plurality of zones each forming a strip of the same prescribed zone height and assigning an integer zone number to each strip. The zone number of the zone where each object or point in the database resides is then assigned to the object or point. In addition, the zone number of every zone intersected by the search area is identified. Next, for each object or point associated with each zone number identified as intersected by the search area, it is first determined whether a first coordinate of the object or point under consideration, which defines its location along the width of the strip in which it resides, is within the range of the first coordinate of the base point less a distance defining the extent of the search area in a first direction along the width of the base point's strip and the first coordinate of the base point plus the same distance defining the extent of the search area in the opposite direction along the width of the base point's strip. The object or point under consideration could be designated as a nearby neighbor candidate if it found to be within the aforementioned range. However, an additional refining action can be performed which involves eliminating an object or point as a nearby neighbor candidate if its second coordinate representing its height within the geometric system is outside a height range of the search area. If it is within the height range then it designated as a candidate. The object or point is considered a candidate because the foregoing action simply limits the number of objects and/or points that have to be put through the next action which computes the actual distance between the base point and the candidate object or point. This latter action is relatively processor intensive and so limiting the number of objects and/or points that must be considered is advantageous. If it is next determined that the actual distance between the candidate object or point and the base point is equal to or less than the distance defining the extent of the search area in either direction along the width of the strip, the candidate object or point is designated as a nearby neighbor of the base point.

The foregoing procedure has applicability in systems where the geometric data is defined in terms of spherical or planar coordinates. In the case of spherical coordinates, the location of each object or point of interest included in the database of geometric data is defined in terms of the declination (dec) and right ascension (ra) of the object or point from the center of a sphere representing the spherical system. The user-specified base point is also defined in terms of spherical coordinates ("@ra", "@dec") and resides within the search area defined by a prescribed radius ("@r") from the base point.

The aforementioned action of dividing the geographic system defined by said geometric data into a plurality of zones involves dividing the sphere into declination strips. In addition, the action of assigning an integer zone number to each strip involves assigning numbers in a bottom to top sequence starting with the south pole of the sphere being designated as zone number 0.

The zone in which an object or point resides is determined by dividing the sum of the dec value of the object or point (in degrees) and 90 degrees, by the prescribed zone height. The result is then rounding down to the nearest integer value to obtain the applicable zone number. The zone numbers of every zone intersected by the search area are identified by first computing the zone number of the northernmost zone intersected by the search area. This involves adding @dec plus 90 degrees plus @r, and dividing the resulting sum by the prescribed zone height. The result is then rounded up to the nearest integer value to obtain the zone number. Similarly, the zone number of the southernmost zone intersected by the search area is computed by adding @dec and 90 degrees, and subtracting @r from the resulting sum. This difference is then divided by the prescribed zone height, and rounded down to the nearest integer value to obtain the zone number. The zone numbers of the northernmost and southernmost zones, and the zone number of every zone between them is deemed to be the zone numbers of the zones intersected by the search area.

In a spherical system, the aforementioned action for determining whether the first coordinate of the object or point under consideration is within the specified range, entails determining whether the ra value (representing the first coordinate of the object or point under consideration) is between the range of @ra−@r' and @ra+@r', where @ra represents the first coordinate of the base point and @r' is the distance defining the extent of the search area in either direction along the width of the strip and is equal to @r corrected for right ascension compression corresponding to the dec value of the base point. More particularly, this right ascension compression correction involves dividing @r by cos(abs(dec))+ϵ, where ϵ is an arbitrary small number intended to prevent division by zero. The aforementioned optional action of eliminating objects and/or points as nearby neighbor candidates if they are not within the height range of the search area is implemented as follows in a spherical system. First, it is determined if the object or point has a dec value that falls between @dec−@r and @dec+@r. If it does, it is designated as a nearby neighbor candidate. Otherwise it is eliminated from consideration. The aforementioned database associated with a spherical system should also specify the location of objects and/or points in terms of the J2000 coordinate system (as cx, cy, cz). In addition, the base point is specified in the J2000 scheme as well (i.e., as @cx, @cy, @cz). This characterization facilitates computing the actual distance between the base point and the candidate object or point. More particularly, the computation finds the distance θ in degrees between the base point and the candidate object or point under consideration as $$2 \times \arcsin\sqrt{\frac{(cx - @cx)^2 + (cy - @cy)^2 + (cz - @cz)^2}{2}}.$$

Another refinement applicable to the spherical system is the creation of margin objects and/or points. Margin objects and/or points are created to deal with the problem of a search area that crosses the prime meridian of the sphere (i.e., where ra is near 0° or ra is near 360°). Essentially, the foregoing search equations do not have any provision to loop forward to ra values starting at 0° if the search area extends past the 360° mark. Likewise, there is no provision to loop back to ra values of 360° or less if the search area extends back past the past the 0° mark. Creating margin objects and/or points that represent the actual objects and/or points in the aforementioned transition regions but which are assigned ra valued either in excess of 360°, or less than 0°, allows them to be considered without complicating the procedure. Margin objects and/or points are created by creating objects having ra values with in a prescribed range ending with 360° as a left margin by subtracting 360 from the ra value and assigning the result, which will be a negative number, as the ra value for the margin object or point. Similarly, a right margin is created by adding 360 to the ra values of objects and points having ra values within a prescribed range starting with 0° and assigning the result, which will be a number greater than or equal to 360°, as the ra value for the margin object or point. The aforementioned prescribed margin range employed for each object or point considered can be set equal to the prescribed radius of the search area corrected for the right ascension compression by dividing the radius by cos (abs (dec'))+ϵ, where dec' is the dec value of the object or point under consideration.

In the case of planar system, the location of each object or point of interest included in the database of geometric data is defined in terms of the rectangular coordinates (x, y) of the object or point from a prescribed origin of the planar system. The user-specified base point is also defined in terms of rectangular coordinates. The aforementioned action of dividing the geographic system defined by said geometric data into a plurality of zones involves dividing the plane into lateral strips. In addition, the action of assigning an integer zone number to each strip involves assigning numbers in a bottom to top sequence starting with the bottommost part of the plane being designated as zone number 0.

If the rectangular coordinates scheme has an origin at the lower left hand corner of the plane defined by the planar system, then there is no need to compensate for negative coordinate values when assigning zone numbers to the zones or determining what zone each object or point in the database resides, as was needed with spherical coordinates where the declination values typically range from −90° to +90°. If the origin is elsewhere (such as in the center of the plane), then the x and y location values from the database will have to be compensated for by adding a number equal to the absolute value of the maximum negative x coordinate value associated with the planar system to the x coordinate values of any object or point taken from the database, and adding a number equal to the absolute value of the maximum negative y coordinate values to the y coordinate values taken from the database, to produce corrected x and y values respectively. In addition, the same correction is made to the coordinates of the specified base point if it is defined in terms of the planar system of the database.

The zone in which an object or point resides is determined by dividing the corrected y value of the object or point under consideration by the prescribed zone height, and then rounding down to the nearest integer value. The zone numbers of every zone intersected by the search area are identified by first computing the zone number of the topmost zone intersected by the search area. This involves adding @y to @r, and dividing the resulting sum by the prescribed zone height, where @y represents the corrected y value of the base point and @r is the distance defining the extent of the search area in either direction along the width or height of the zone from the base point. The result is then rounded up to the nearest integer value to obtain the zone number. The zone number of the bottommost zone intersected by the search area is computed by subtracting @r from @y. This difference is then divided by the prescribed zone height, and rounded down to the nearest integer value to obtain the zone number. The zone numbers of the topmost and bottommost zones, and the zone number of every zone between them is deemed to be the zone numbers of the zones intersected by the search area. It is noted that @r can represent a prescribed radius from the base point, or one-half the width of a square search area centered on the base point.

In the case of the aforementioned action for determining whether the first coordinate of the object or point under consideration is within the specified range, this entails determining whether the corrected x value representing the first coordinate of the object or point under consideration is between the range of @x−@r and @x+@r, where @x represents the corrected x value of the first coordinate of the base point. In addition, the aforementioned optional action of eliminating objects and/or points as nearby neighbor candidates if they are not within the height range of the search area is implemented as follows in a planar system. First, it is determined if the object or point has a corrected y value that falls between @y−@r and @y+@r. If it does, it is designated as a nearby neighbor candidate. Otherwise it is eliminated from consideration. Finally, it is noted that the computations required to determine the actual distance between two objects and/or points is much simpler to compute in the planar case in that a conventional right triangle computation is all that is needed.

In either the spherical or planar cases, a zone table can be created to facilitate the foregoing procedures. This entails first determining the zone number for each object and point in the database and then creating table entries specifying the identity, ra value, dec value and zone number for each object or point. The zone table can be used to obtain an object's or point's identity, ra value, dec value and zone number, rather than obtaining these items from the database. This will result in decreased processing time and faster results. This is especially true if primary keys are established for the identity, ra value and zone number entries.

Another refinement that is applicable to both the spherical and planar cases employing circular search areas, involves further limiting the number of objects or points that are deemed to be candidate nearby neighbors prior to determining the actual distance between the candidates and the base point. This is advantageous because computing the actual distance values is relatively processor intensive. This refinement is applicable when the search area crosses multiple zones because with the foregoing procedures, the width range (i.e., @ra−@r' and @ra+@r' in the spherical case and @x−@r and @x+@r in the planar case) is too "fat" a band for any zone except the one holding the center of the search area (i.e., the base point). Thus, if the band in adjacent zones were limited to the widest portion of the search area that intersects that zone, fewer candidate objects or points that are not in the search area will be identified. Essentially, the narrower band is achieved by replacing @r with "a" in the foregoing width range filtering procedures when searching for nearby object and point candidates for a zone not containing the base point. More particularly, in the spherical case, "a" is equal to @r corrected for right ascension compression corresponding to the declination of the object or point under consideration whenever that object or point is in the same zone as the base point, and "a" is set equal to one half the width of the widest portion of the search area that intersects the zone containing the object or point under consideration whenever that object or point is not in the same zone as the base point. Thus the width range filtering procedure is modified to determine if the ra value of the object or point under consideration is between the range of @ra−a and @ra+a.

In the planar case, "a" is equal to @r whenever the object or point under consideration is in the same zone as the base point, and is set equal to one half the width of the widest portion of the search area that intersects the zone containing the object or point under consideration whenever that object or point is not in the same zone as the base point. Thus, in this case, the width range filtering procedure is modified to determine if the corrected x value of the object or point under consideration is between the range of @x−a and @x+a.

The foregoing procedures can also be advantageously employed in a "batch-type" process embodying the present invention where nearby neighbor objects and/or points of interest are identified for each object or point of interest located in a prescribed plurality of consecutive zones (which can cover the entire sphere or just part of it) from information accessed from the aforementioned database. Thus, in effect, each object or point in the zones of interest is in turn considered to be the aforementioned base point. In the case of a spherical coordinate database, the process begins in the same way by dividing the sphere into the plurality of zones and assigning an integer zone number to each zone in a bottom to top sequence starting with the bottommost zone being designated as zone number 0. In addition, it is determined what objects and/or points in the database reside in the plurality of zones and that zone number is then assigned to the object or point. Margin objects and/or points are also established, and a zone table can also be constructed to speed up the processing.

For each of the plurality of zones, the zone under consideration is designated as a base zone, and a previously unselected object or point residing in the currently designated base zone is selected. Next, those zones that are located to the north of the currently designated base zone and which are at least partially traversed by a line of a prescribed length (e.g., @r) extending northward from the northern border of the currently designated base zone, if any, as well as those zones that are located to the south of the currently designated base zone and which are at least partially traversed by the prescribed-length line extending southward from the southern border of the currently designated base zone, if any, are identified. The identified northern and southern zones, as well as the currently designated base zone itself are then designated as neighbor zones. While the prescribed length line can be any length desired, the present "batch" procedure is most efficient when the line is equal to the prescribed zone height. In such a case, only the zones located immediately to the north and south of the currently designated base zone would be designated as neighbor zones, along with the base zone itself.

A previously unselected one of the neighbor zone is then selected, and a previously unselected object or point residing within the currently selected neighbor zone is also selected. Next, it is optionally determined whether the value of the currently selected base zone object or point is greater than or equal to 0° and less than 360°, or the value of the currently selected neighbor zone object or point is greater than or equal to 0° and less than 360°. The purpose of this action is to prevent margin objects or points from being processed more than once. If the foregoing conditions are met, it is then optionally determined whether the identity number assigned to the selected base zone object or point is less than the identity number assigned to the selected neighbor zone object or point. The purpose of this action is to eliminate half of the computations that would follow. In this way a significant processing cost savings is realized and the time required to create the nearby object or point table is decreased considerably. The key to this savings is the realization that if an object or point is deemed nearby another, the other object or point must necessarily be considered nearby the first object or point (and similarly if an object or point is not nearby another, the other is not nearby the first). Thus, once it is determined that an object or point under consideration is nearby another object or point, there is no reason to compute whether the other object or point is nearby the first—it is already known that it is. Whenever the foregoing condition is true, it is next determined whether the ra value of the selected neighbor zone object or point falls within a ra range between the ra value of the selected base zone object or point minus @r' and the ra value of the selected base zone object or point+@r', where @r' is @r corrected for right ascension compression corresponding to the dec value of the selected base zone object or point. If the ra value of the selected neighbor zone object or point falls within the aforementioned ra range, the selected neighbor zone object or point is designated as a nearby neighbor candidate. Optionally, prior to designating an object or point as a nearby neighbor candidate, a dec range filtering operation can be performed to further limit the number of candidates that must be considered in the actions to follow. Specifically, it is first determined if the selected neighbor zone object or point has a dec value that falls within the dec range defined by the dec value of the selected base zone object or point minus @r and the dec value of the selected base zone object or point plus @r. The selected neighbor zone object or point is then only designated a nearby neighbor candidate if it falls within the dec range.

It is next determined if the candidate object or point is in a circular area centered on the selected base zone object or point and having a radius equal to @r by computing the actual distance between the selected base zone object or point and the candidate object or point, and ascertaining if the actual distance is equal to or less than @r. Whenever it is ascertained that the actual distance is equal to or less than @r, the candidate object or point is designated as a nearby neighbor of the selected base zone object or point. The actual distance θ in degrees between the selected base zone object or point and the candidate object or point under consideration is computed as $$\theta = 2 \times \arcsin \sqrt{\frac{(o1.cx - o2.cx)^2 + (o1.cy - o2.cy)^2 + (o.1cz - o.2cz)^2}{2}},$$

where (o1.cx, o1.cy, o1.cz) represents the coordinates of the selected base zone object or point and (o2.cx, o2.cy, o2.cz) represents the coordinates of the candidate object or point under consideration.

The process continues by adding all mirror relationships of those already in the table: that is if the pair o1, o2 is in the neighbors table, then the pair (o2, o1) is added to the table, assuming the action of determining whether the identity number assigned to the selected base zone object or point is less than the identity number assigned to the selected neighbor zone object or point was implemented. This establishes those nearby neighbor relationships that where ignored when the identity number assigned to the selected base zone object or point was found not to be less than the identity number assigned to the selected neighbor zone object or point. A new object or point residing within the currently selected neighbor zone is then processed in the same way until all the objects and/or points therein have been considered. Once all the objects and/or point in the currently selected neighbor zone are considered, a new one of the neighbor zones is chosen and the process is repeated for each object and point of that neighbor zone. When all the neighbor zones have been considered, a new object or point residing in the base zone is selected and the entire process is repeated over and over until all the base zone objects and/or points have been processed. A new base zone is then chosen and the process repeated until all the prescribed plurality of zones has been selected as a base zone and processed. This is a step-by-step description, in one preferred implementation of the invention all the points and zones are processed in parallel by using set-oriented operators.

A nearby neighbors table can be created using the foregoing procedure to identify the nearby neighbor relationships. Essentially, for each base zone object or point selected, entries specifying an identity of the base zone object or point and the identity of each object or point designated to be a nearby neighbor of the base zone or point, are established. In addition, the table can include entries specifying the ra value, dec value and zone number of each object or point entered into the table. Primary keys can be established for the identity, ra value and zone number entries of each object or point entered in the table to facilitate fast searches.

In the case of a database containing planar coordinate location data, the foregoing "batch" procedure can be simplified. It is essentially the same, except in the planar case, the process begins with the plane being divided into the plurality of zones and an integer zone number to each zone in a bottom to top sequence starting with the bottommost zone being designated as zone number 0, in the manner described previously for planar cases. In addition, the previous planar case procedure is used to determine what objects and/or points in the database reside in the plurality of zones and that zone number is assigned to the object or point. No margin objects and/or points are established as they are not required in the case of planar data. Accordingly, the action employed in the spherical case to determine whether the value of the currently selected base zone object or point is greater than or equal to 0° and less than 360°, or the value of the currently selected neighbor zone object or point is greater than or equal to 0° and less than 360°, is not needed. Also, in the case of planar data, the spherical case ra filtering action is replaced with an action of determining whether the corrected x value of the selected neighbor zone object or point falls within a lateral range between @x−@r and @x+@r, wherein @x represents the corrected x value of the currently selected base zone object or point. Likewise, in the case of planar data, the optional spherical case dec filtering action is replaced with an action of determining if the selected neighbor zone object or point has a corrected y value that falls between @y−@r and @y+@r, wherein @y represents the corrected y value of the currently selected base zone object or point, and then eliminating the object or point as a nearby neighbor candidate if its corrected y value falls outside this height range. In addition, a square or circular region can be employed in the planar case, so it is determined if the candidate object or point is in a square or circular region centered on the selected base zone object or point by computing the actual distance between the selected base zone object or point and the candidate object or point. If the region is circular it can have a radius equal to @r. If the region is square, it can have a width equal to 2@r. Still further, the actual distance between the selected base zone object or point and the candidate object or point under consideration is computed using conventional right triangle techniques.

The foregoing system and process for identifying nearby neighbor objects and/or points of interest in relation to a user-specified base point, and the variation for finding the nearby neighbors of all the objects and/or points in zones of interest, can be readily expanded beyond just the spherical and planar cases described above. For example, the system and process can be readily adapted to databases containing other types of spatial data, such a data characterized in cylindrical, conical, or hyperbolic coordinate systems, among others. In addition, the foregoing system and process can be advantageously implemented for databases containing non-spatial data where the data objects and points are characterized by at least two parameters which substitute for the spatial coordinates in the procedures described above. For example, pixel color data could be characterized this way. Still further, while the foregoing description involved data characterized by just two parameters (i.e., their coordinates), the system and process according to the present invention can be adapted for finding nearby neighbors in systems involving data characterized by three parameters (e.g., 3D spatial data) or even more.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 7A is a graph that plots computation time vs. the radius of the search area for identifying potential nearby objects for various zone heights. The graph shown in FIG. 7B plots computation time vs. the best time, for each search area radius.

DETAILED DESCRIPTION OF THE PREFERRED EMBODIMENTS

Figure 1:
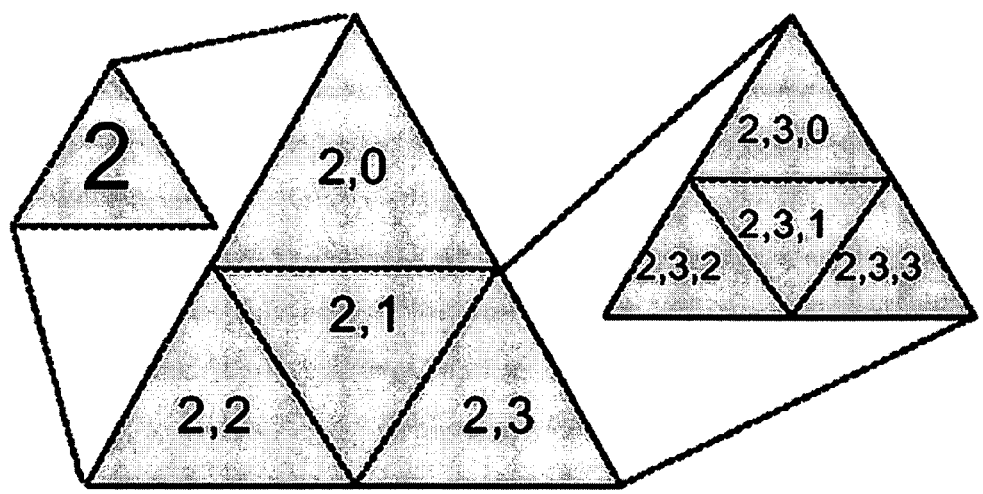
FIG. 1 is a diagram depicting HTM partitions of a sphere and the hierarchically decomposes of each face with a recursive sequence of triangles.
Figure 2:
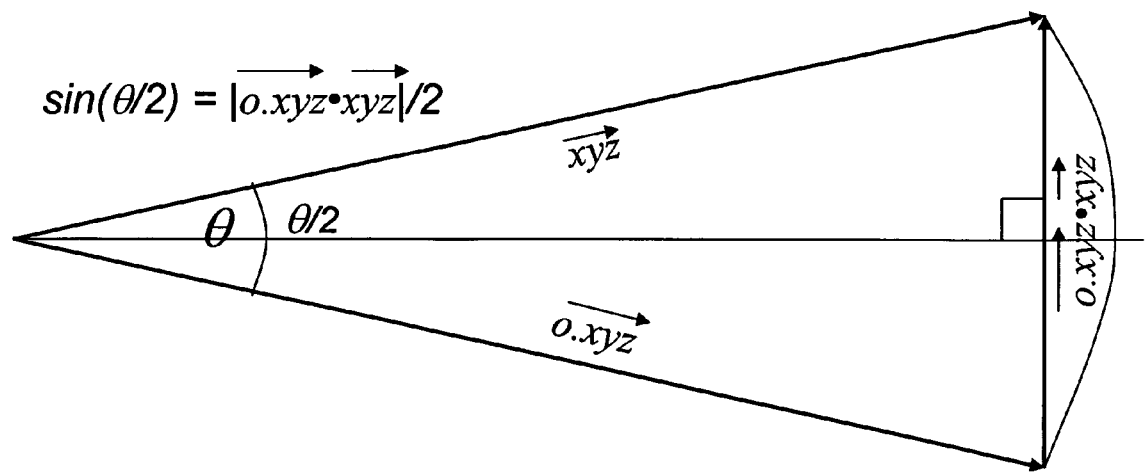
FIG. 2 is a diagram depicting the geometric relationships between an object or location under consideration (which is known to be at point x,y,z) and an object identified in the search (i.e., object o with celestial coordinates o.cx, o.cy, o.cz).

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In general, the system and process according to one embodiment of the present invention identifies all nearby neighbor objects and/or points in relation to a user-specified base point based on information accessed from a database which includes a set of parameters for each object and point. More particularly, this entails first identifying a range of a first pre-selected one of the set of parameters into which that parameter of each of the objects and/or points in the database falls, and then dividing the database into a plurality of zones each forming an equal sized sub-range of the identified range. An integer zone number is assigned to each sub-range in a bottom to top sequence starting with the bottommost zone, which is the sub-range having the smallest values for the pre-selected parameter, being designated as zone number 0. The zone each object or point in the database is associated with is also determined and the zone number of that zone is assigned to the object or point. In addition, the zone number of every zone intersected by a search area is identified. The search area is defined by at least a prescribed search range of the first pre-selected parameter centered on the value of the first parameter of the base point and a prescribed search range of a second pre-selected one of the set of parameters centered on the value of the second parameter of the base point.

Next, for each object or point associated with each zone number identified as intersected by the search area, it is determined whether the second parameter of the object or point under consideration falls within a range defined by the second parameter of the base point less a prescribed value and the second parameter of the base point plus the prescribed value. If so, the object or point under consideration is designated as a nearby neighbor candidate. It is then determined if the candidate object or point is in the search area by computing the actual divergence between the base point and the candidate object or point in regard to their first and second parameters, and ascertaining if this actual divergence places that the candidate object or point within the bounds of the search area. If it does, the candidate object or point is designated as a nearby neighbor of the base point.

Optionally, prior to designating an object or point as a nearby neighbor candidate, an object or point can be eliminated as a candidate if its first parameter falls outside a range defined by the first parameter of the selected base point less a prescribed value and the first parameter of the selected base point plus the prescribed value. The foregoing actions involving processing each object or point in the database, or each object or point associated with each zone number identified as intersected by the search area, can be performed in parallel on a prescribed number of objects and/or points, where each object or point processed in parallel is processed by a different processor. In addition, the actions can be implemented using set-oriented operators which facilitate straightforward and automatic execution of process actions, such as afforded by SQL relational operators, and preferably using a SQL-based program capable of automatically implementing the aforementioned parallelism.

In the case where it is desired to identify nearby neighbor objects and/or points for many or all of the objects and/or points in the database, the procedure can be modified as follows to "batch" process the data. As before, the database is divided into a plurality of zones each of which is assigned an integer zone. In addition, the zone each object or point of interest in the database is associated with is determined and the zone number of that zone is assigned to the object or point.

Next, for each of the of zones, the zone under consideration is designated as the base zone, and a previously unselected object or point associated with the currently designated base zone is selected. Those zones that correspond to a sub-range having values of the pre-selected parameter that are larger than those of the currently designated base zone and which are equal to or less than a prescribed upper limit of the pre-selected parameter are identified, as are those zones that correspond to a sub-range having values of the pre-selected parameter that are smaller than those of the currently designated base zone and which are equal to or greater than a prescribed lower limit of the pre-selected parameter. The resulting identified zones above and below the currently designated base zone, as well as the currently designated base zone itself, are then designated as neighbor zones. A previously unselected neighbor zone is selected as is a previously unselected object or point associated with the selected neighbor zone. It is then determined whether a second one of the set of parameters of the objects and/or points of the selected neighbor zone falls within a range defined by the second parameter of the selected base zone object or point less a prescribed value and the second parameter of the selected base zone object or point plus the prescribed value. If so, the object or point is designated as a nearby neighbor candidate. It is next determined if the candidate object or point is within a prescribed degree of similarity between it and the selected base zone object or point by computing the actual divergence between them in regard to their first and second parameters. Whenever it is ascertained that the actual divergence is within the prescribed degree of similarity, the candidate object or point is designated as a nearby neighbor of the selected base zone object or point. These actions are repeated for each previously unselected object and point associated with the each neighbor zone, and for every remaining previously unselected object and point residing within the currently selected base zone.

Here again, the optional action of eliminating the selected neighbor zone object or point as a candidate if its said first parameter falls outside a range defined by the first parameter of the selected base zone object or point less a prescribed value and the first parameter of the selected base zone object or point plus the prescribed value, prior to designating the selected neighbor zone object or point as a candidate object or point, can be implemented.

The foregoing "batch" procedure can be further refined to increase efficiency by implementing the following actions. Specifically, prior to determining whether the second one of the set of parameters of the objects and/or points of the selected neighbor zone falls within a range defined by the second parameter of the selected base zone object or point less a prescribed value and the second parameter of the selected base zone object or point plus the prescribed value, it is determined whether an identity number assigned to the selected base zone object or point has a prescribed hierarchical relationship to an identity number assigned to the selected neighbor zone object or point. Only when this prescribed hierarchical relationship exists is the processing of the selected neighbor zone object or point continued. In this way the processing is reduced dramatically. To capture the nearby neighbor relationships ignored by the foregoing action, subsequent to designating a candidate object or point as a nearby neighbor of the selected base zone object or point, the selected base zone object or point is designated as a nearby neighbor of the candidate object or point. The prescribed hierarchical relationship between the identity number assigned to the selected base zone object or point and the identity number assigned to the selected neighbor zone object or point can be either that the identity number assigned to the selected base zone object or point is less than the identity number assigned to the selected neighbor zone object or point, or that the identity number assigned to the selected base zone object or point is greater than the identity number assigned to the selected neighbor zone object or point. It is noted that as an alternate procedure, all the computations involving finding nearby neighbors could be completed before designating the mirror relationships as a nearby neighbor relationships.

The foregoing actions involving the processing of each object or point in the database, or performed subsequent to selecting a previously unselected object or point associated with the currently selected neighbor zone, can be performed in parallel on a prescribed number of objects and/or points, where each object or point processed in parallel is processed by a different processor. In addition, the actions can be implemented using SQL, and preferably using a SQL-based program capable of automatically implementing the aforementioned parallelism.

As indicated previously, the foregoing system and process can be readily adapted not only to the spherical and planar cases needed to search for nearby neighbors in databases containing location data defined by spherical coordinates, such as the SDSS, or databases containing location data defined in terms of a planar coordinate scheme, such as a electronic map, but can be applied other types of spatial data, as well as databases containing non-spatial data where the data objects and points are characterized by at least two parameters which substitute for the spatial coordinates. However, the concepts involved in adapting the present invention to any database having geometric data or not, can be fully explained in terms of spherical and planar cases. Thus, the remaining part of the description of the present invention will concentrate on describing the present invention in the context of databases containing geometric data characterized by spherical coordinate or planar coordinate systems. The procedures described can then be readily implemented for other spatial or non-spatial data schemes, as desired.

1.0 Exemplary Operating Environment

Figure 3:
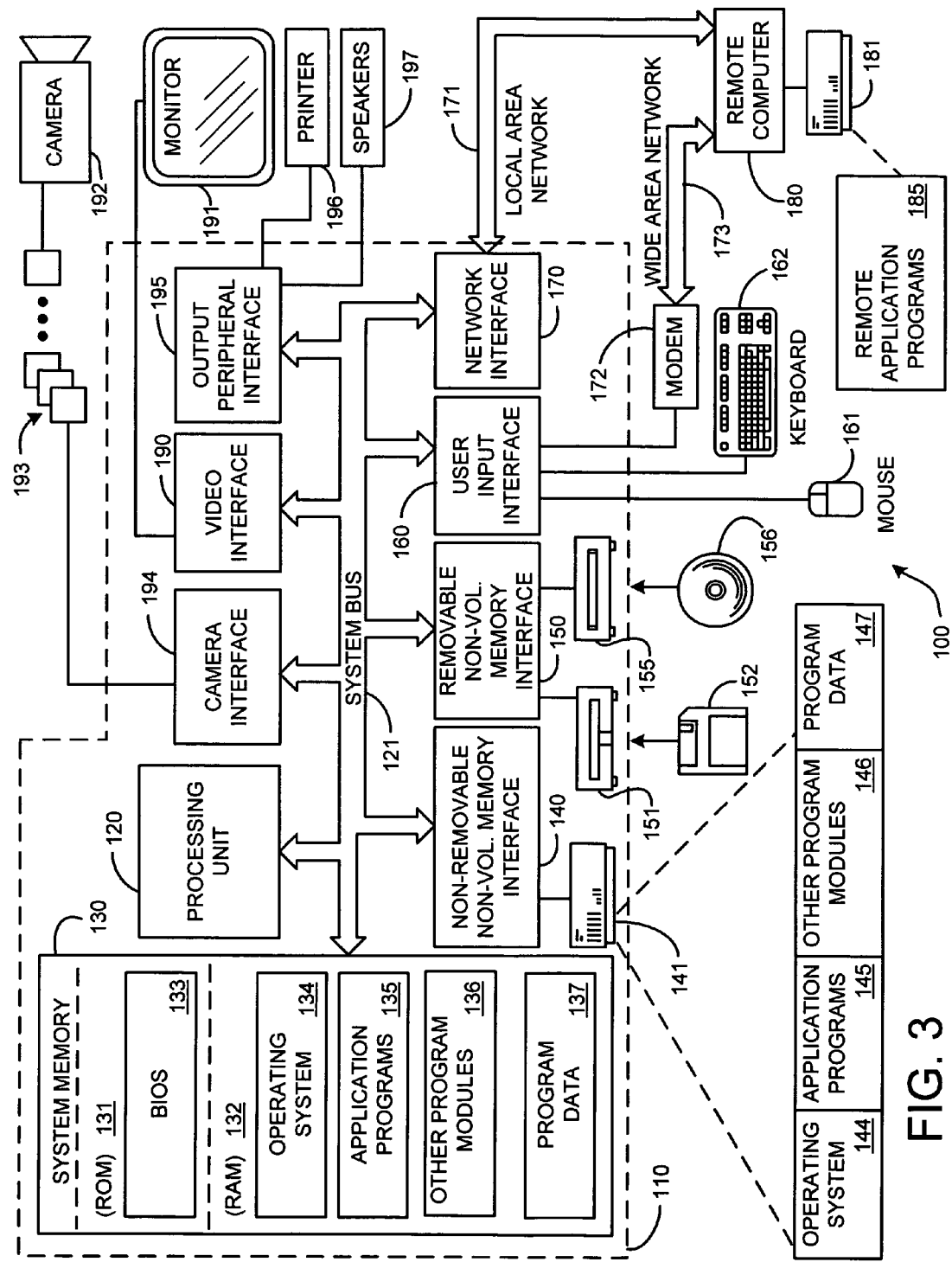
FIG. 3 is a diagram depicting a general purpose computing device constituting an exemplary system for implementing the present invention.

Before providing a description of the embodiments of the present invention, a brief, general description of a suitable computing environment in which the invention may be implemented will be described. FIG. 3 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use With the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 31 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

2.0 Acceleration of "Get Nearby Neighbors" Functions

In general, the process according to one embodiment of the present invention finds nearby objects or points of interest using a database of geometric information about these objects or points that includes their location, which is either in spherical or planar coordinates. As the spherical case is more complex, it will be described first and then the simplifications for planar data will be discussed.

Figure 4:
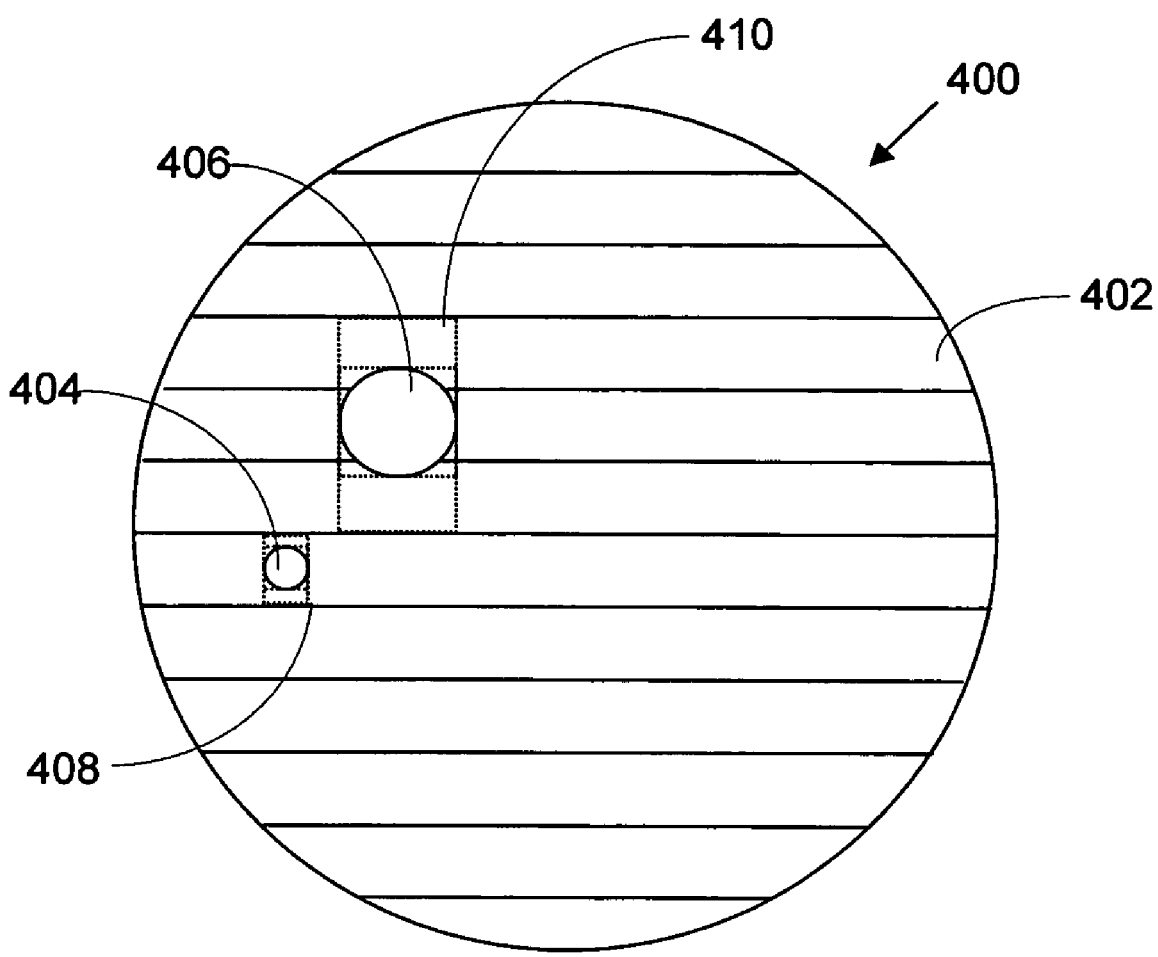
FIG. 4 is a diagram depicting a simplified example of a zone-mapped sphere.

More particularly, in one embodiment of the process and system, nearby objects and/or points are identified in relation to a user-specified base object or point. In the case of a spherical coordinate system, the celestial sphere is mapped into zones, each of which represents a declination stripe of the sphere with some height (referred to as its zoneHeight). A simplified example of this zone mapping is shown in FIG. 4, where a sphere 400 has been divided into 12 zones 402. It is noted that in an actual system, the sphere would be sectioned into thousands of zones. The zones are numbered from bottom to top with the south-pole zone being designated as "ZoneNumber" zero. Given this geometry, the zoneNumber of an object or point of interest can be found by dividing the sum of its declination in degrees ("dec") degrees plus 90 degrees by the prescribed zoneHeight, and then rounding down to the nearest integer value. In terms of SQL relational database language this relationship is express as:

$$zoneNumber = \text{floor}((dec+90)/zoneHeight). \tag{3}$$

The declination of an object or point as obtained from the database is added to 90 degrees to bring it into the zone numbering scheme described above as declinations are usually express as ranging from −90 degrees to +90 degrees. Thus, for example, an object with a declination of −90 would have zone number of (−90+90)/zoneHeight=0, corresponding to the south pole zone of the sphere as would be expected. There will also be a maximum zoneNumber equal to (90+90)/zoneHeight. The zoneHeight value is prescribed and represents the desired resolution of the system. For example, in the zone mapped sphere depicted in FIG. 4, the prescribed zoneHeight would have to be 15 degrees in order to create the 12 zones shown. In a more realistic example, a tested version of the present invention was used to find nearby objects in the aforementioned SDSS database. In the tested versions, the prescribed zoneHeight was set to 30 arcseconds thereby creating 21,600 zones.

2.1 The Zone Table

Each object or point of interest in the database is assigned a zone number. One way of accomplishing this task is to create a zone table that lists the zone of each object as determined using Eq. (3). The following SQL code can be used to build such a zone table in the case of the SDSS database where the right ascension (ra), declination (dec), and celestial coordinates (cx, cy, cz) are listed in a table of objects called "PhotoObj":

```
create table zone (zone int, objID bigint, ra float, dec float,    (4)
    x float, y float, z float,
    primary key (zone, ra, objID))
insert into zone
    select floor((dec+90) /zoneHeight), ra, dec, cx, cy, cz
    from PhotoObj
```

2.2 Limiting the Scope of the Search

With the zone table in place it is possible to quickly search for all objects within a certain radius of point (ra, dec) by looking in only certain zones, and only in certain parts of each zone. This is the filtering phase of the operation. Indeed, to find all objects within a desired radius of a point, only zones within the reach of the radius must be considered. This is illustrated in FIG. 4, where two circular neighborhoods 404, 406 defined by different radii are shown. One of the neighborhoods 404 fits inside a single zone. Whereas, the other neighborhood 406, which is associated with a larger radius, crosses 3 zones. The zoneNumbers of the zones intersected by a neighborhood having a prescribed radius (R) can be identified given the declination (DEC) and right ascension (RA) of the point at the center of the neighborhood (assuming RA and DEC have been normalized to be in the ranges [0°, 360°] and [−90°,90°] respectively). This is accomplished by computing the ZoneNumber of the most northern zone intersected (referred to as maxZone) as the sum of DEC plus 90 degrees plus R, divided by the prescribed zoneHeight, and then rounding up to the nearest integer value. Similarly, the ZoneNumber of the most southern zone intersected (referred to as minZone) is computed as the difference of DEC plus 90 degrees minus R, divided by the prescribed zoneHeight, and then rounded down to the nearest integer value. In terms of SQL relational database language this "zone filter" is expressed as:

$$maxZone = \text{ceiling } ((DEC+90+R)/zoneHeight)$$

$$minZone = \text{floor}((DEC+90-R)/zoneHeight) \quad (5)$$

Thus in the example neighborhoods illustrated in FIG. 4, minZone equals maxZone for neighborhood 404, and minZone+2 equals maxZone for the larger neighborhood 406.

As mentioned above, given a radius and a point, not only can the search for neighboring objects and/or points of interest be limited to certain zones, but also to certain parts of each identified zone. Intuitively, only objects and/or points having a right ascension value between the range of RA−R and RA+R within each of the identified zones need to be considered as potential nearby objects. However, there are some issues owing to the geometry of a sphere that need to dealt with in using the right ascension values of objects in a zone to limit the number that will be considered as potential nearby objects and/or points. First, since a sphere is round, the right ascension range must be computed modulo 360°, and the simplistic RA−R to RA+R range expression must be corrected for the fact that the right-ascension is "compressed" by the positive cos(dec) as it moves away from the equator. Consequently, the right ascension value of the given point is divided by cos(abs (dec)). In addition, a small value "ε" (e.g., 1e-6) is added to prevent division by zero when dec is ±90°. Thus, the right ascension value of the given point is preferably divided by cos(abs(dec))+ε. In terms of SQL relational database language the foregoing "ra filter" is expressed as:

$$o.ra \text{ between } (ra-R)/(\cos(abs(dec)))+\epsilon) \text{ and } (ra+R)/(\cos(abs(dec)))+\epsilon) \quad (6)$$

where o.ra refers to the right ascension value of an object or point of interest.

The dotted line boxes 408, 410 shown around the example neighborhoods 404,406 in FIG. 4 illustrate how the foregoing ra filter and zone filter further reduce the search. Namely, only objects or points of interest identified in the previously-constructed zone table that are in zones between and including minZone and maxZone, and which have ra values between and including $(ra-R)/(\cos(abs(dec)))+\epsilon)$ and $(ra+R)/(\cos(abs(dec)))+\epsilon)$, need to be considered as candidate nearby objects and/or points of interest.

2.3 Margins

Another refinement to the present search procedure involves dealing with the problem of a search area that crosses the prime meridian of the sphere (i.e., where ra=0° or ra=360°). Essentially, the foregoing search equations do not have any provision to loop forward to ra values starting at 0° if the search area extends past the 360° mark. Likewise, there is no provision to loop back to ra values of 360° or less if the search area extends back past the 0° mark. This problem is ideally solved without complicating the search equations, which could increase processing time. One way of accomplishing this is to add objects and/or points having ra values with in a prescribed range ending with 360° into the zone table as a "left margin" by subtracting 360 from the ra value and assigning the result (which will be a negative number) as the ra value for the margin object or point. Similarly, a "right margin" is created by adding 360 to the ra values of objects and/or points having ra values within a prescribed range starting with 0° and assigning the result (which will be a number greater than or equal to 360°) as the ra value for the margin object or point. The prescribed margin ranges would be set equal to the radius of the search area corrected for right ascension compression (i.e., by dividing the radius by $(\cos(abs(dec))+\epsilon)$, where dec' is the declination of the object or point under consideration. This procedure ensures all the potential nearby objects and/or points are identified even if the search origin has a ra value of 0° or 360°. In terms of SQL relational database language the foregoing margin creation procedure is expressed as:

```
Insert into zone      -- right margin, notice +360 on ra      (7)
   select floor((dec+90) /zoneHeight), ra+360, dec, x, y, z
   from PhotoObj
   where ra >= 0
      and ra < MaxRadius/(cos(radians(abs (dec)))+ ε)
Insert into zone      -- left margin, notice -360 on ra
   select floor((dec+90) /zoneHeight), ra-360, dec, x, y, z
   from PhotoObj
   where ra >= 360-MaxRadius/(cos(radians(abs (dec)))+ ε)
      and ra < 360
``` where maxRadius is the prescribed search radius that must exceed the maximum search radius allowed in neighbors searches (e.g., 1°) and ε is a tiny number intended to prevent division by zero. It is noted that the procedure of Eq. (7) is designed for use with the SDSS database and so looks for objects in the "PhotoObj" table. However, the procedure can be modified for use with any geometric database desired by specifying the appropriate source for the object data.

2.4 The Search Procedure

Figure 5A:
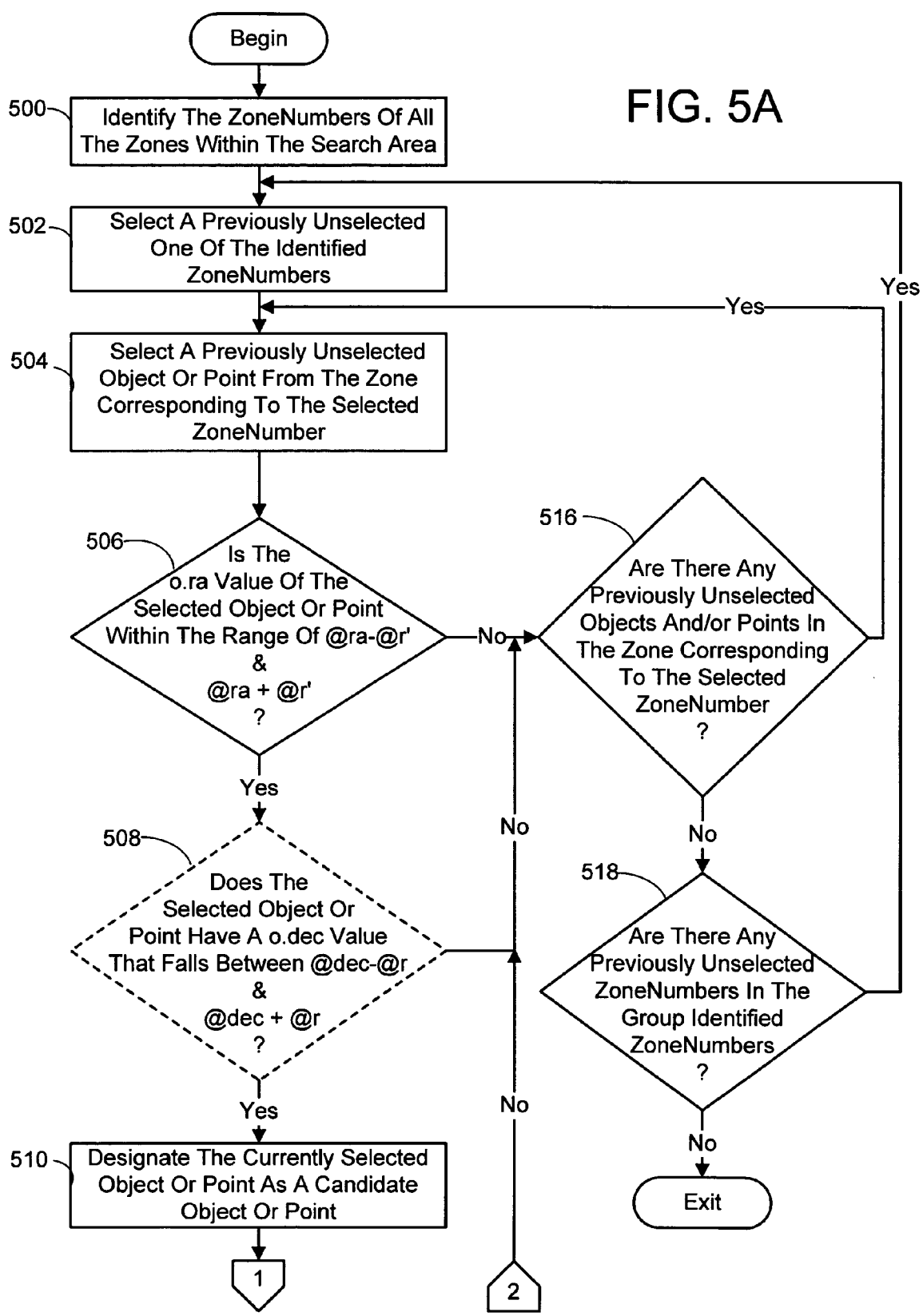
FIGS. 5A and 5B are a flow chart diagramming an overall process for identifying nearby neighbor objects and/or points of interest in relation to a user-specified base point.
Figure 5B:
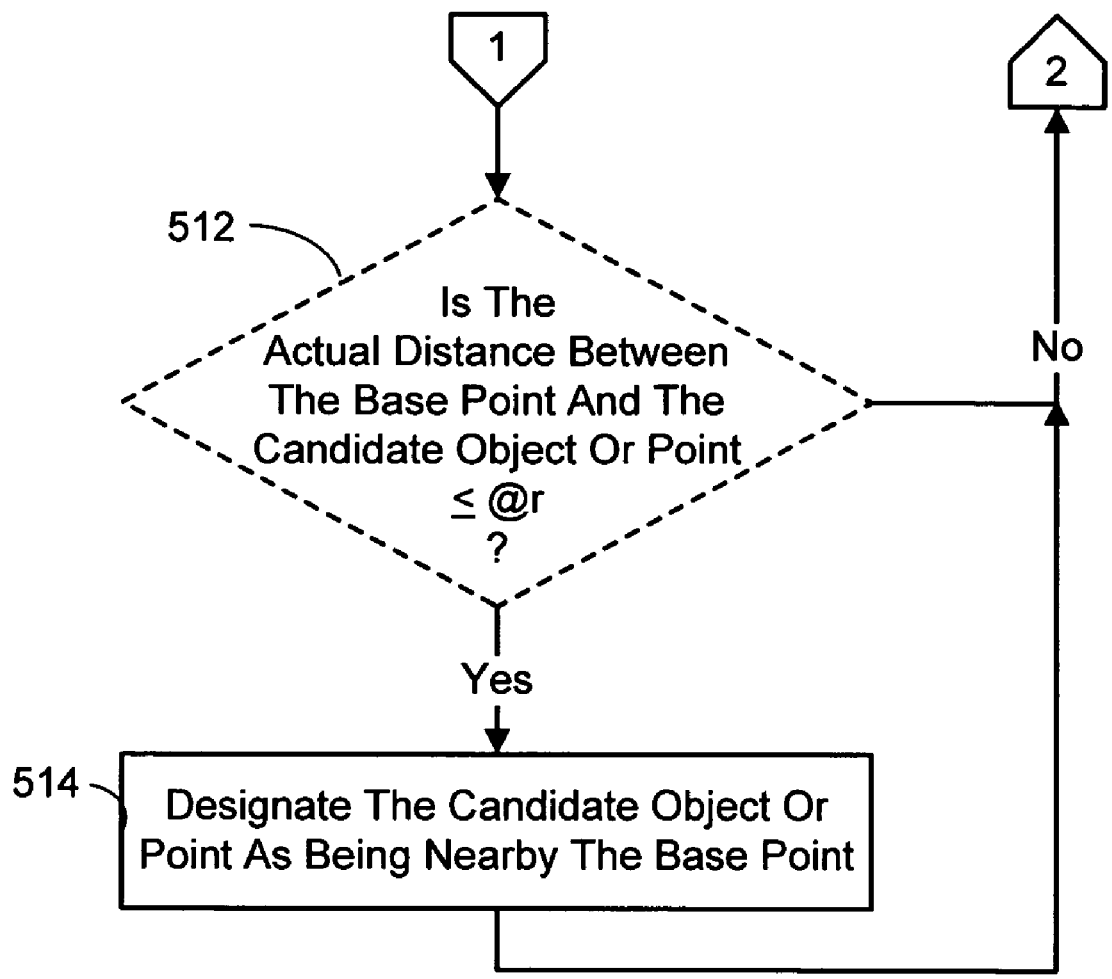

Given that the zone table has been expanded to include margins, Eqs. (4) and (5) will find all neighbors within the zone. More particularly, referring to FIGS. 5A and 5B, the full query to select the neighbors within a given radius "@r" of a base point having the coordinates ("@ra", "@dec") begins by identifying the zoneNumbers of all the zones within the search area defined by @ra (process action 500). As described previously, this entails computing the maxZone as the sum of @dec plus 90 degrees plus @r, divided by the prescribed zoneHeight, and then rounding up to the nearest integer value. Similarly, the minZone is computed as the difference of @dec plus 90 degrees minus @r, divided by the prescribed zoneHeight, and then rounded down to the nearest integer value. The zones involved in the search are deemed to be those having zoneNumbers between and including minZone and maxZone.

Once the zoneNumbers of the zones involved in the search are identified, a previously unselected one of them is selected (process action 502). Next, a previously unselected object or point identified in the zone table as being in the currently selected zoneNumber is selected (process action 504). It is then determined in process action 506 whether the o.ra value of the currently selected object or point as read from the zone table (where the "o." identifies the value as being associated with a selected object or point) is between the range of @ra−@r' and @ra+@r', where @r' is @r corrected for right ascension compression corresponding to the declination of the currently selected object or point (i.e., @r'=@r/(cos(abs(o.dec))+ϵ)). If so, the processing of the currently selected object or point continues. Otherwise the currently selected object or point is eliminated from consideration and it is determined if there are any remaining unselected objects or points of interest in the selected zone (process action 516). If so, previously unselected object or point is selected and processed by repeating actions 504 through 516, as appropriate. If no unselected object or point remains in the currently selected zone, then it is determined in process action 518 whether there are any remaining unselected zones in the group identified previously. If so, then the procedure continues by repeating actions 502 through 518, as appropriate. If it is determined that there are not remaining zones to select, the procedure ends.

Figure 6:
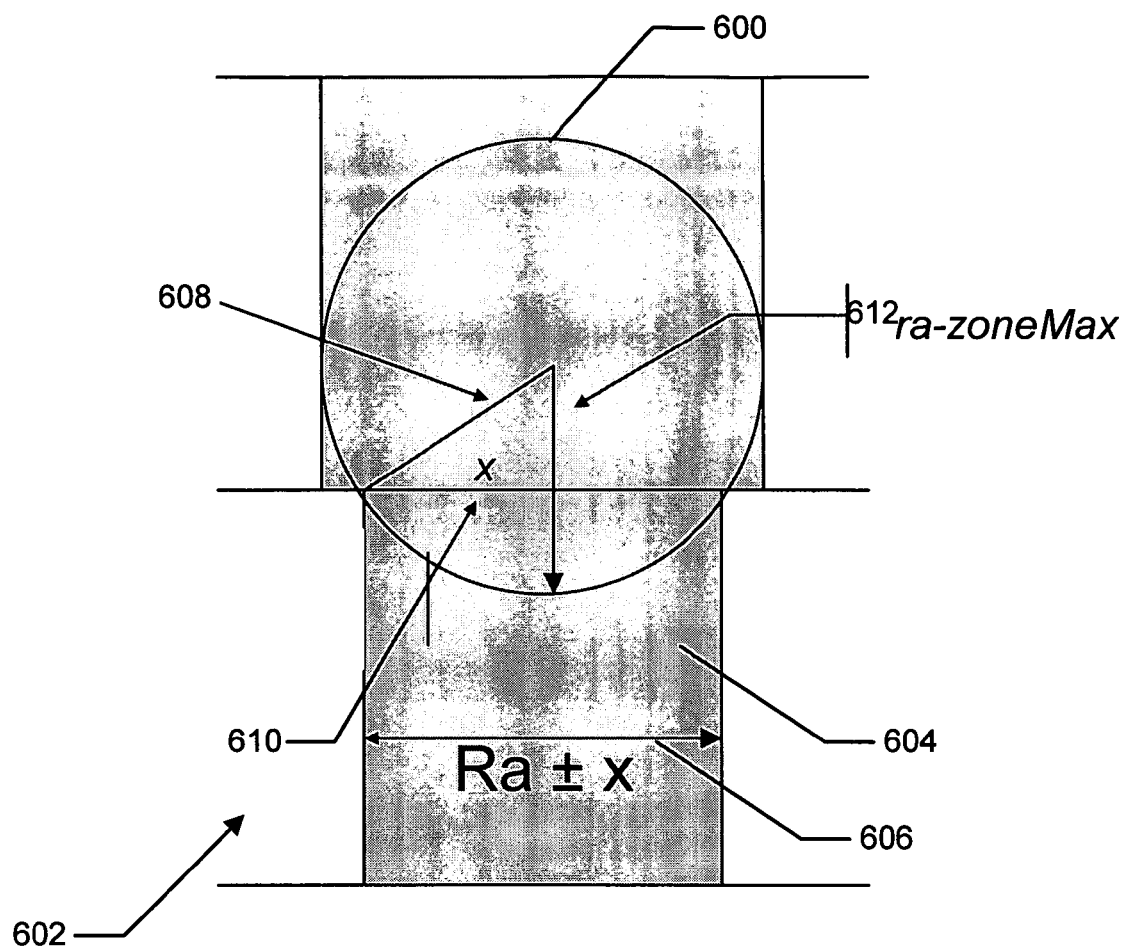
FIG. 6 is a diagram depicting a close-up view of two adjacent zones with a circular search area shown intersecting portions of each zone.

The foregoing portion of the nearby object identification procedure corresponds to the filtering phase discussed earlier, which is designed to limit the number of candidate objects or points prior to using the aforementioned geometric computations to establish precisely which candidate objects or points are in the search area. However, a refinement can be implemented to further limit the number of candidate objects or points, so as to keep the relatively more computationally expensive geometric computations to a minimum. This refinement involves eliminating those objects or points that are outside the declination range of the search area. As shown in FIG. 6, when a search area 600 extends into but not completely through a zone 602, the result is that those objects or points having declination values placing them outside the search area (e.g., those below the search area in the example of FIG. 6 shown in region 604), should not be included as candidates. However, without the present refinement this is precisely what happens as all the objects or points within the identified zones are considered candidates if they are within the right ascension range of the search area. Referring once again to FIGS. 5A and 5B, the aforementioned extraneous objects and points can be eliminated as candidates by optionally determining if the currently selected object or point has a declination value (o.dec) that falls between @dec−@r and @dec+@r (process action 508). The optional nature of an action is indicated the figures by a broken line box. If the selected object or point has a dec value within the aforementioned range, it is designated as a candidate (process action 510). Otherwise, the selected object or point is eliminated from consideration and it is determined if there are any remaining unselected objects or points of interest in the selected zone (process action 516). If so, another previously unselected object or point is selected and processed by repeating actions 504 through 516, as appropriate. If no unselected objects or point remain in the currently selected zone, then it is determined in process action 518 whether there are any remaining unselected zones in the group identified previously. If so, then the procedure continues by repeating actions 502 through 518, as appropriate. If it is determined that there are not remaining zones to select, the procedure ends.

With the filtering phase complete, the nearby object identification procedure determines if the candidate object or point is actually in the search area via a geometric computation. Specifically, in process action 512, it is determined if the actual distance between the base point and the candidate object or point of interest is equal to or less than @r. This is accomplished by computing the distance θ in degrees between the base point (which is known to be at point @Cx, @cy, @cz) and the candidate object or point under consideration (i.e., object o with celestial coordinates o.cx, o.cy, o.cz as read from the zone table or database) using the following equation:

$$\theta = 2 \times \arcsin\sqrt{\frac{(o.cx - @cx)^2 + (o.cy - @cy)^2 + (o.cz - @cz)^2}{2}} \qquad (8)$$

and then comparing θ to @r. If it is determined that θ is equal to or less than @r, then the candidate object or point is designated as being nearby the base point (process action 514). If not, the candidate is eliminated from consideration. Either way, it is next determined if there are any remaining unselected objects or points of interest in the selected zone (process action 516). If so, another previously unselected object or point is selected and processed by repeating actions 504 through 516, as appropriate. If no unselected objects or points remain in the currently selected zone, then it is determined in process action 518 whether there are any remaining unselected zones in the group identified previously. If so, then the foregoing procedure continues by repeating actions 502 through 518, as appropriate. When it is determined that there are not remaining zones to select, the procedure ends.

The foregoing nearby object identification procedure can be implemented using the following SQL relational database language instructions:

```
select o1.objID
    from zone o1              -- force the zone
    where o1.zoneID between   -- using zone number and ra interval
        floor((@dec+90−@r)/@zoneHeight) and
        ceiling((@dec+90+@r)/@zoneHeight)
    and o1.ra between @ra − @r/(cos(radians(abs(o1.dec)))+
    @notZero)
        and @ra + @r/(cos(radians(abs(o1.dec)))+ @notZero)
    and o1.dec between @dec−@r  -- quick filter on dec
        and @dec+@r
    and (2*degrees(asin(sqrt(
        power(o1.cx−@cx,2)+power(o1.cy−@cy,2)+power(o1.cz−
            @cz,2))/2))) ≦ @r   -- careful filter on distance
where @notZero is the prescribed ϵ.
```

The number of candidate objects or points can be further limited prior to the geometric check, by observing that the right ascension range @ra−@r' and @ra+@r' is too "fat" a band for any zone except the one holding the center of the search area (i.e., the base point), as illustrated in FIG. 6, whenever the search area crosses multiple zones. Thus, if the band in adjacent zones were limited to the widest portion of the search area that intersects that zone, fewer candidate objects or points that are not in the search area will be identified. Essentially, the narrower band 606 is achieved by replacing @r 608 with "a" 610 in the foregoing ra filtering procedure when computing nearby objects or points of interest for a zone not containing the base point being considered.

Given @r 608, and computing line segment "b" 612, allows "a" 610 to be computed in Cartesian coordinates as:

$$a=\sqrt{@r^2-b^2} \quad (9)$$

where b is the distance from the circle center point and the closest edge of the zone boundary. ZoneDec is the declination of that edge, and $\epsilon$ is a tiny number added to prevent division by zero. If the zone is above the point it is $$b=(ZoneNumber \times zoneHeight)-@dec \quad (10)$$

and if the zone is below the point b is computed as $$b=@dec-((ZoneNumber+1) \times zoneHeight). \quad (11)$$

For spherical coordinates, b may be approximated by taking modifying equations 10 and 11 with the right ascension compression (i.e., by dividing the b by (cos(abs(ZoneEdgeDeclination))+$\epsilon$), where ZoneEdgeDeclination is the declination of the closest edge of the zone and $\epsilon$ is a tiny number intended to avoid division by zero.

Figure 7A:
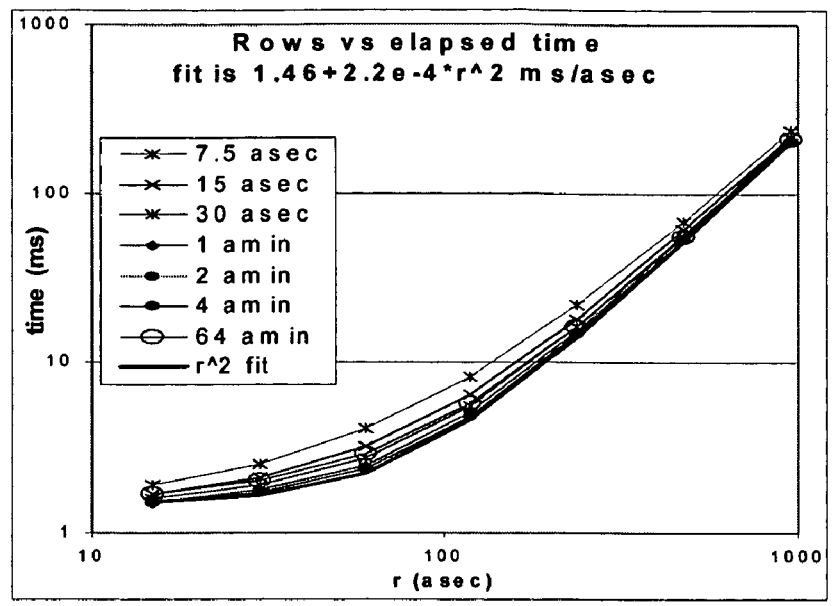
FIGS. 7A and 7B are graphs showing the performance of the process of FIGS. 5A & 5B.
Figure 7B:
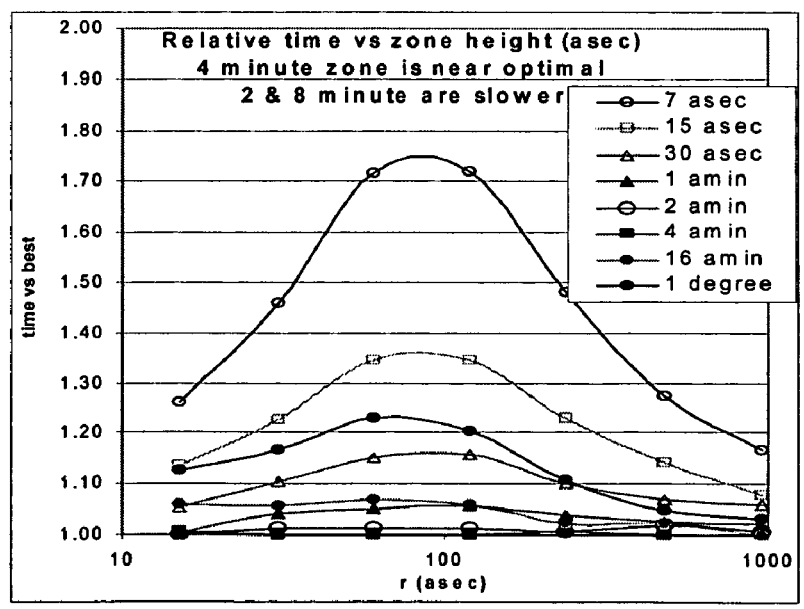

The foregoing nearby object identification procedure gives the performance described in FIGS. 7A & 7B for a table-valued function that finds neighbors nearby a point. FIG. 7A is a graph that plots computation time vs. the radius of the search area for identifying potential nearby objects for various zone heights. It suggests that any small zone height is adequate. The graph shown in FIG. 7B plots computation time vs. the best time, for each search area radius. It indicates that a zoneHeight of 4 arcminutes is near-optimal. It is also noted that establishing a primary key in the zone table on zones makes the search lookup very fast, which contributes to the performance of the procedure. This incidentally also shows that table-valued functions can be quite fast. The performance characteristics shown in FIGS. 7A and 7B represent a 3× speedup over the aforementioned HTM external procedures because it avoids calling an external procedure as is needed in the HTM approach (the typical call time is 1.8 milliseconds vs. the typical 5.6 milliseconds of the HTM-based stored procedures). These changes turn the 2-week build-the-neighbors job into a 5-day job. But, a more dramatic speedup can be implemented discussed in the next section.

3.0 Acceleration of "Nearby Neighbors" Table Building Functions

The foregoing nearby object identification procedure was designed to find an object or point of interest nearby a specified base point, which required a particular amount of time to compute. However, as mentioned previously, this neighbor data can be pre-computed for every object or point in the geometric database and used to generate neighbor tables. Once the tables are created, the end user can obtain nearby object or point data more quickly than possible if computed from scratch.

The neighbors table can be defined as:

```
Create table neighbors (    o1 bigint not null,    -- first object
                            o2 bigint not null,    -- second object
                            ....                   -- other useful fields
                       )
```

The nearby object identification procedure described in the last section could be used to compute the information needed to create the neighbors table. However, when one wants to batch-compute many neighbors, as would be the case in generating neighbor tables, it is possible to use a variation of the zone approach described previously in a way that produces another 10-fold speedup (or more if parallelism is employed by using multiple processors). This batch-compute variation is also useful outside the context of creating neighbor tables, such as when a user wants to know the nearby object or points for every object or point in a series of zones, which need not include all the zones of the sphere or plane.

Figure 8A:
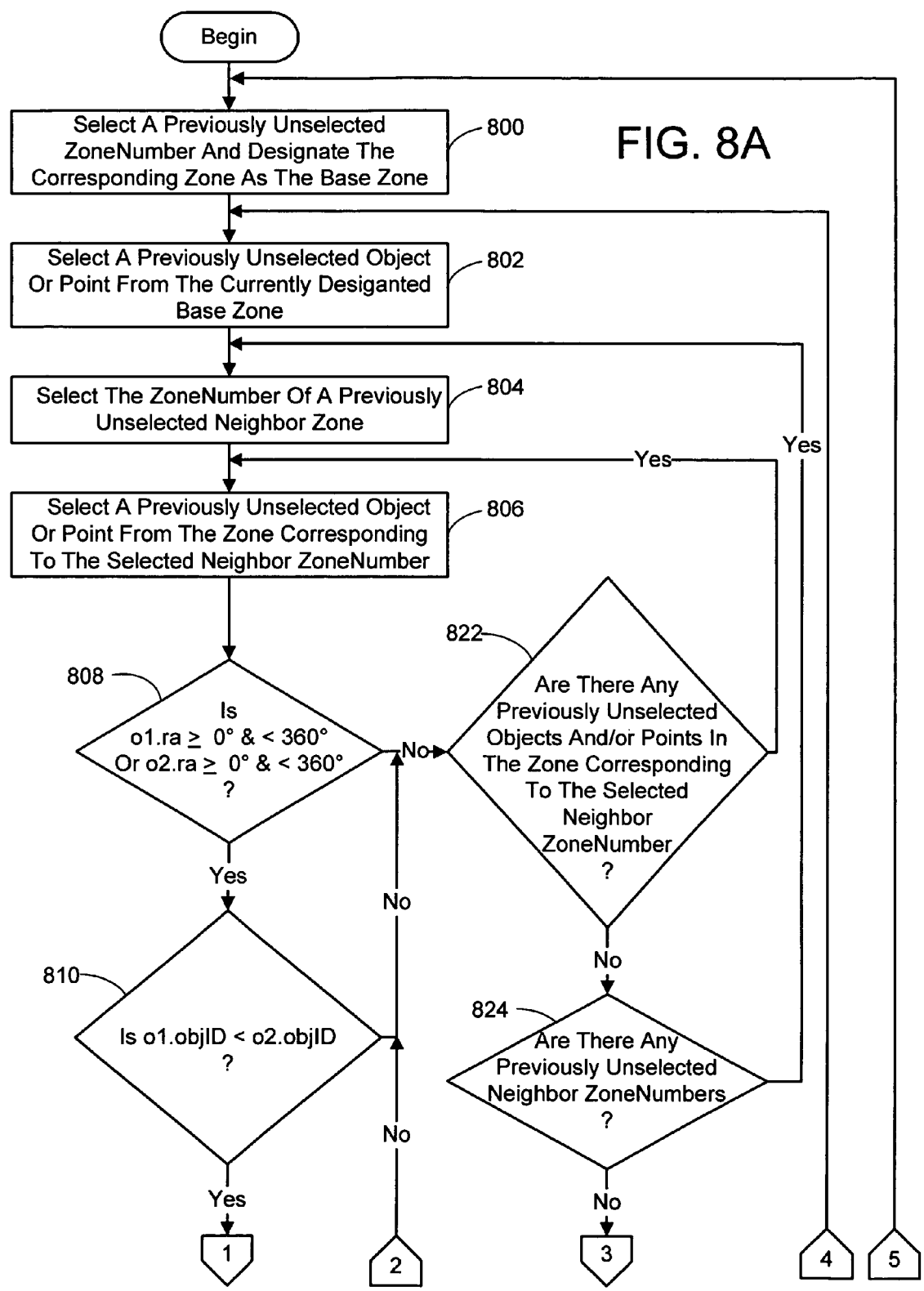
FIGS. 8A and 8B are a flow chart diagramming an overall process for identifying nearby neighbor objects and/or points of interest for each object or point of interest located in a prescribed plurality of consecutive zones.
Figure 8B:
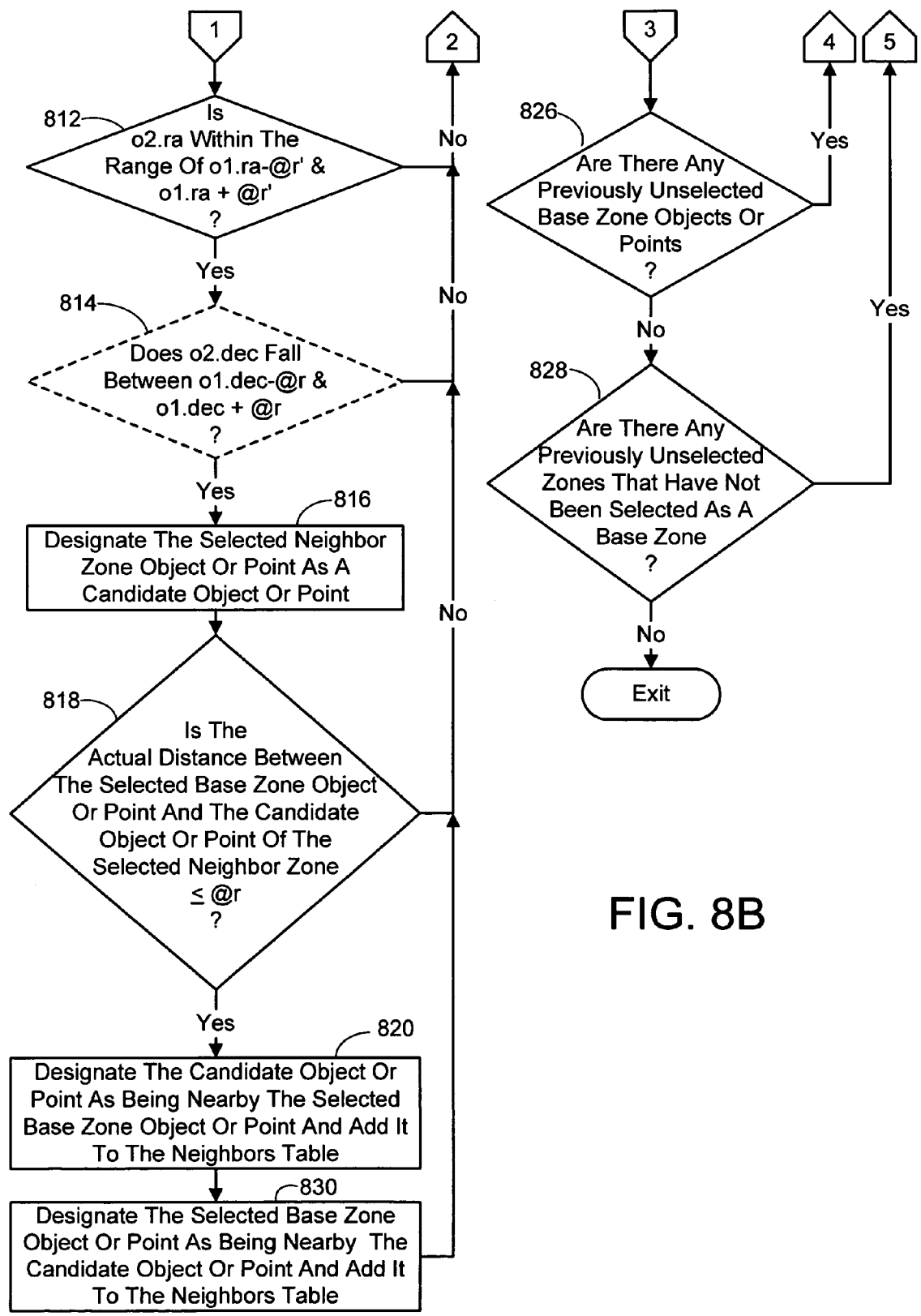

The batch-compute variation of the zone approach involves joining each zone in a search area with itself and then with its neighboring zones to the north and south. These three joins all use the relational operators with automatic parallelism and with some very sophisticated optimizations built into most modern relational database systems. The join procedure used to compute the nearby neighbors of all the objects or points in each zone of interest begins as shown in FIGS. 8A & 8B by selecting a previously unselected zoneNumber and designating the zone as the base zone (process action 800). Then, a previously unselected object or point identified in the zone table as being in the selected base zone is selected (process action 802). Next, the zoneNumber of a "neighbor" zone, which assuming @r is equal to the prescribed zoneHeight as will be discussed shortly, will include the zone immediately to the north (i.e., the base zoneNumber+1), the base zone itself (i.e., the base zoneNumber+0), and the zone immediately to the south (i.e., the base zoneNumber−1) of the currently selected base zone, is selected (process action 804). This is followed by selecting a previously unselected object or point identified in the zone table as being in the selected neighbor zone (process action 806). If the base zone is the north pole zone, then there is no neighbor zone to the north and only the north pole zone itself and the zone immediately to the south are considered as neighbor zones. Likewise, if the base zone is the south pole zone, only the south pole zone itself and the zone immediately to the north are considered as neighbor zones.

It is then determined in process action 808 whether the value of the currently selected base zone object or point (which is designated as o1.ra where the "o1" identifies the value as being associated with a selected object or point of the selected base zone) is greater than or equal to 0° and less than 360°, or the value of the currently selected neighbor zone object or point (which is designated as o2.ra where the "o2" identifies the value as being associated with a selected object or point of the selected neighbor zone) is greater than or equal to 0° and less than 360°. If one or both of these two conditions holds, then the processing of this pair continues forward. The purpose of process action 808 is to prevent a case in which both of the selected objects or points are margin objects or points. If both were margin objects or points, then duplicate pairs could be processed which would be a mistake. In addition, it is determined in process action 810 whether the identity number of the selected base zone object or point (o1.objID) is less than the identity number of the selected neighbor zone object or point (o2.objID). If so, the processing of this pair continues forward. The significance of this action will be discussed shortly.

Next, in process action 812 it is determined whether o2.ra is between the range of o1.ra−@r' and o1.ra+@r', where @r' is @r corrected for right ascension compression corresponding to the declination of the currently selected base zone object or point (i.e., @r'=@r/(cos(abs(o1.dec))+$\epsilon$)). This action essentially determines if the neighbor object or point is within the "ra range" of the selected object or point in the base zone. If o2.ra satisfies the condition, then the procedure continues processing the pair of points as will be described shortly. However, if it is determined in action 808 that the selected objects or points are outside the specified ranges, or in action 810 that o1.objID is greater than o2.objID, or in action 812 that o2.ra is outside the ra range of the selected object or point in the base zone, the currently selected neighbor zone object or point is eliminated from consideration and it is determined if there are any remaining unselected objects or points of interest in the selected neighbor zone (process action 822). If so, another previously unselected neighbor zone object or point is selected and processed by repeating actions 806 through 822, as appropriate. If no unselected objects or points remain in the currently selected neighbor zone, then it is determined in process action 824 whether there are any remaining unselected neighbor zones. If so, then the procedure continues by repeating actions 804 through 824, as appropriate. If it is determined that there is no neighbor zone left to select, it is next determined if there are any remaining unselected base zone objects or points (process action 826). If there are, then the actions 802 through 826 are repeated, as appropriate. If there are no base zone objects or points left to select, it is determined if there are any zones it is desired to include in the neighbor table that have not been selected as a base zone (process action 828). If there are such unselected zones, then the procedure continues by repeating actions 800 through 828. If not, then the procedure ends.

In optional process action 814, it is determined if the currently selected neighbor zone object or point has a declination value (o2.dec) that falls between o1.dec−@r and o1.dec+@r. This action determines whether the neighbor object or point is within the "dec range" of the selected object or point in the base zone. If it is, the currently selected object or point is designated as a candidate (process action 816). Otherwise, the selected object or point is eliminated from consideration and, as before, it is determined if there are any remaining unselected objects or points of interest in the selected neighbor zone (process action 822). If so, another previously unselected neighbor zone object or point is selected and processed by repeating actions 806 through 822, as appropriate. If no unselected objects or points remain in the currently selected neighbor zone, then it is determined in process action 824 whether there are any remaining unselected neighbor zones. If so, then the procedure continues by repeating actions 804 through 824, as appropriate. If it is determined that there is no neighbor zone left to select, it is next determined if there are any remaining unselected base zone objects or points (process action 826). If there are, then the actions 802 through 826 are repeated, as appropriate. If there are no base zone objects or points left to select, it is determined if there are any zones it is desired to include in the neighbor table that have not been selected as a base zone (process action 828). If there are such unselected zones, then the procedure continues by repeating actions 800 through 828. If not, then the procedure ends.

It is next determined if the candidate object or point is actually in the nearby neighborhood defined by a circle with a radius of @r. This is accomplished by determining if the actual distance between the selected base zone object or point and the candidate object or point of the selected neighbor zone is equal to or less than @r (process action 818). Specifically, the distance θ in degrees between the selected base zone object or point (which will have the coordinates o1.cx, o1.cy, o1.cz) and the candidate neighbor zone object or point under consideration (which will have the coordinates o2.cx, o2.cy, o2.cz) using the following equation:

$$\theta = 2 \times \arcsin\sqrt{\frac{(o1.cx - o2.cx)^2 + (o1.cy - o.2cy)^2 + (o.1cz - o.2cz)^2}{2}}, \quad (12)$$

and then comparing θ to @r. If it is determined that θ is equal to or less than @r, then the candidate object or point is designated as being nearby the selected base zone object or point and added to the neighbors table (process action 820). The procedure then continues with process action 830, which adds the mirror relationship to the neighbors table as will be discussed shortly. If, however, θ is not equal to or less than @r, the candidate is eliminated from consideration.

Upon completion of process action 830 or if the candidate is eliminated from consideration, it is once again determined if there are any remaining unselected objects or points of interest in the selected neighbor zone (process action 822). If so, another previously unselected neighbor zone object or point is selected and processed by repeating actions 806 through 822, as appropriate. If no unselected objects or points remain in the currently selected neighbor zone, then it is determined in process action 824 whether there are any remaining unselected neighbor zones. If so, then the procedure continues by repeating actions 804 through 824, as appropriate. If it is determined that there is no neighbor zone left to select, it is next determined if there are any remaining unselected base zone objects or points (process action 826). If there are, then the actions 802 through 826 are repeated, as appropriate. If there are no base zone objects or points left to select, it is determined if there are any zones it is desired to include in the neighbor table that have not been selected as a base zone (process action 828). If there are such unselected zones, then the procedure continues by repeating actions 800 through 828. If not, then the procedure ends.

The foregoing procedure can be implemented using the following SQL relational database language instructions:

```
insert neighbors                    -- insert one zone's neighbors
select o1.objID as objID,
       o2.objID as NeighborObjID,
       .. other fields elided
from zone o1 inner loop join zone o2  -- force a nested loop
join on o1.zoneID-@deltaZone =        -- using zone number and ra
o2.zoneID
    and o2.ra between o1.ra - @r/(cos(radians(abs(o1.dec)))+ @notZero)
        and o1.ra + @r/(cos(radians(abs(o1.dec)))+ @notZero)
where ( o1.ra >= 0 and o1.ra < 360   -- objects not both marginal
    or o2.ra >= 0 and o2.ra < 360 )
  and o1.objID < o2.objID             -- do 1/2 the work now
  and o2.dec between o1.dec-@r and o1.dec+@r -- quick filter on dec
  and (2*DEGREES(ASIN(sqrt(
      power(o1.cx-o2.cx,2)+power(o1.cy-o2.cy,2)+power(o1.cz-
            o2.cz,2))/2))) <= @r     -- careful filter on distance
where @notZero is the prescribed ε, and the procedure is performed for
@deltaZone in {-1, 0, 1}.
```

In regard to the previously described action of determining whether the identity number of the selected base zone object or point (o1.objID) is less than the identity number of the selected neighbor zone object or point (o2.objID), before considering a selected neighbor zone object or point, this part of the procedure is employed to eliminate half of the computations that would follow. In this way a significant processing cost savings is realized and the time required to create the nearby object or point table is decreased considerably. The key to this savings is the realization that if an object or point is deemed nearby another, the other object or point must necessarily be considered nearby the first object or point (and similarly if an object or point is not nearby another, the other is not nearby the first). Thus, once it is determined that an object or point under consideration is nearby another object or point, there is no reason to compute whether the other object or point is nearby the first—it is already known that it is. Accordingly, the foregoing procedure actually does only half the work of creating the nearby neighbor tables. This is because it only considers neighbor zone objects or points where o1.objID<o2.objID. It is assumed in this procedure that each object or point in the geometric database is assigned a unique number. The numbers provide a convenient way select one or the other of every pair of objects or points processed to determine if they are to be deemed nearby each other. Geometric databases will typically include the object or point numbering characteristic (e.g., the SDSS database). However, if they do not, some other distinguishing feature unique to each object or point can be chosen to accomplish this same task (for example its (x,y) coordinates or its (lat, lon) coordinates). In addition, since the purpose is to process one, but not both of a pair of objects and/or points, the reverse relationship could be used instead. For example, if objID numbers are employed, the procedure could consider only neighbor objects or points where o1.objID>o2.objID.

Given that not all the nearby neighbor relationships are found in the foregoing procedure, the procedure includes a final process action which adds mirror records for each pair of objects or points deemed to be nearby each other. More particularly, for each neighbor zone object or point designated as being nearby the selected base zone object or point in process action 820, the selected base zone object or point is designated as being nearby the neighbor zone object or point, and added to the neighbors table (process action 830). For example, if two objects or points are processed in the foregoing procedure where one has an objID=42 and the other has an objID=32, only the object or point having the objID=32 will be fully processed to determine if it is nearby the object or point having its objID=42. Suppose further that it is determined that these two objects or points are nearby each other (so being in the same or adjacent zones). Thus, the procedure would initially only enter the object or point with objID=42 as a nearby neighbor of the object or point with objID=32, when the zone having the object or point with objID=32 is selected as the base zone. When the zone containing the object or point with objID=42 is selected as the base zone, the object or point with objID=32 will not be considered in determining the nearby neighbor relationship because the o1.objID (i.e., objID=42 in this example) would be greater than o2.objID (i.e., objID=32 in this example). However, the mirror nearby neighbor relationship would be entered into the neighbors table via process action 930.

Casting the above discussion in SQL, the final step of the neighbors table computation to add in the mirror pairs is:

| | |
|---|---|
| insert neighbors | insert one zone's neighbors |
| select o2, o1 from neighbors; | mirror neighbor pairs. |

This optimization has two benefits. First, it prevents marginal neighbors from being added twice as might happen near the poles, and secondly, as indicated above adding the mirror records, rather than computing them, speeds the computation. In tested embodiments of the nearby neighbors procedure, it was found that the optimization resulted in about a 30% increase in computation speed as can be gleaned from the following discussion of the cost of each phase.

The foregoing nearby neighbors procedure runs at about 2.8 k objects per second, computing a 1% subset of the SDSS Early Data Release database in about a minute. The old algorithm took more than an hour on the same data and hardware. On a 154 k object database the times for these steps are:

| | | | |
|---|---|---|---|
| Build zone table: | 9.483 seconds | generated | 128,469 rows |
| Join to zone −1 | 10.487 seconds | generated | 389,157 rows |
| Join to zone 0 | 16.513 seconds | generated | 126,104 rows |
| Join to zone 1 | 9.433 seconds | Total | 1,287,460 rows |
| Add mirror rows | 10.723 seconds | | |
| Create index is | 7.563 seconds | | |
| Total time | 64.203 seconds | | |

In regard to the aforementioned assumption that @r is equal to the prescribed zoneHeight, this is desirable because in the testing of the nearby neighbors procedure it was found that small zones are better, and in particular zoneHeight=@r is optimum. Unlike the nearby computation described in Section 2 that work many different ra values; the zone-join computation of this section compares all objects in one zone to all objects in the other "three" zones within the same designated ra limits. That is, an object is compared with all objects in a box that is 2× radius wide and 3×zoneHeight high (the zone and its north and south neighbors). If @r were to be chosen to be greater than the zoneHeight, a "taller" box would result that encompasses additional north and south zones. The additional zones would require that many more pairs of object or points be processed and the work would rise quadraticly. In fact, the extra joins add enough extra processing time and cost that the savings in doing the zone-join procedure is outweighed. Thus, while the foregoing nearby neighbors procedure could be easily modified to join more zones (as determined for example by using Eq. (5) with the dec value being the declination of the top of the base zone in the first part and the bottom of the base zone in the second part, and within the scope of the present invention, it comes at a cost of increased processing. Thus, setting zoneHeight=@r is preferred. (e.g., ½ arcminute is the radius and zoneHeight used in tested embodiments). This ½ arcminute zone height for computing the neighbors table contrasts to the 4 arcminute zoneHeight found to be optimal for computing the nearby functions for a wide range of radii (rather than just the ½ arcminute radius of the Neighbors table) using the procedure described in Section 2.

4.0 Planar Data Variations

As indicated previously, the foregoing procedures are also applicable to databases containing geometric data in a planar and higher-dimensional coordinate scheme. Because the spherical coordinate system associated with the above-described procedures required certain complicating accommodations, the procedures used to determine nearby neighbors or build neighbor tables for planar geometric data are somewhat simpler. Implementing these simplification, as described below, allow the foregoing procedures to be employed with planar geometric data.

First, it is noted that in a planar system, the zones represent lateral strips, rather than declination strips. In addition, rather than defining the location of an object or point using right ascension and declination or J2000 coordinates, in a planar system, location is defined by rectangular coordinates (e.g., x, y values). Regardless of how the planar location data is characterized, it still must be converted into the "zonal" scheme where the bottommost region starts with a 0 value and increase upwards, just as with spherical coordinates. If the rectangular coordinates scheme has an origin at the lower left hand corner of the plane defined by the planar system, then there is no need to compensate for negative coordinate values when assigning zone numbers to the zones or determining what zone each object or point in the database resides, as was needed with spherical coordinates where the declination values typically range from −90° to +90°. If the origin is elsewhere (such as in the center of the plane), then the x and y location values from the database will have to be compensated for by adding a number equal to the absolute value of the maximum negative x value to the x values taken from the database, and adding a number equal to the absolute value of the maximum negative y value to the y values taken from the database. In addition, there is no need to add marginal points since the plane does not "wrap around" but in a cylindrical or other projection system, the marginal areas might be needed. And, lastly the ra compression as declination rises is not needed. But, again in a conical or non-planar projection system something akin to the ra-compression would be needed.

The search area can remain circular, like in the spherical case, with a prescribed radius (@r), or it could be made square with height and width equal to 2@r without changing the foregoing procedure. In regards to the width filtering (i.e., ra filtering in the spherical case), it is noted that the right ascension compression problem associated with spherical data does not apply in the planar data case. Accordingly, no compensation is required. But, again in a conical or non-planar projection system something akin to the ra-compression would be needed. Still further, the previously described refinement for modifying the width range filtering in zones intersected by a circular search area that do not contain the base point is also applicable in the planar case. In the planar case, "a" is equal to @r whenever the object or point under consideration is in the same zone as the base point, and is set equal to one half the width of the widest portion of the search area that intersects the zone containing the object or point under consideration whenever that object or point is not in the same zone as the base point. Thus, in this case, the width range filtering procedure is modified to determine if the corrected x value of the object or point under consideration is between the range of @x−a and @x+a. Finally, it is noted that the computations required to determine the actual distance between two objects and/or points is much simpler to compute in the planar case in that a conventional right triangle Pythagorean distance computation is all that is needed.

5.0 Alternate Embodiments

While the invention has been described in detail by specific reference to preferred embodiments thereof, it is understood that variations and modifications may be made without departing from the true spirit and scope of the invention. For example, while one of the advantages of the foregoing procedures is that significant processing time can be saved while still using a single processor, it should be noted that multiple processors can be employed as desired to compute in parallel. While the cumulative processing time is not reduced by this method the results are produced faster. Thus, where processing costs are not the primary concern and results are required quickly, the multiple processor option could be employed effectively. It is noted that this parallelism is particularly inviting when the system and process of the present invention is implemented using SQL, which allows for parallel processing when multiple processors are available and in some cases initiates it automatically.

The system and process according to the present invention has been described for 2-dimensional spherical and planar coordinates, but can be applied to other projection systems (cylindrical, conical, hyperbolic, etc,) and to other dimensions (notably 3 dimensional space), and higher dimensional mathematical metric spaces. In addition, the system and process has been described for spatial data, but can be applied to any metric space—for example a data space of points that measure the colors of objects or a data space of points that measure shopping preferences. The techniques have particular applicability to finding clusters of objects in such data spaces.

Wherefore, what is claimed is:

1. A computer-implemented process for identifying all nearby neighbor objects and/or points of interest in relation to a user-specified base point which reside within a search area around the base point based on information accessed from a database of geometric data which includes the location of said objects and/or points of interest, said process comprising:

a dividing step for dividing the geographic system defined by said geometric data into a plurality of zones each forming a strip of the same prescribed zone height and assigning an integer zone number to each strip;

an assigning step for determining what zone each object or point in the database resides and assigning that zone number to the object or point;

an identifying step for identifying the zone number of every zone intersected by the search area; and for each object or point associated with each zone number identified as intersected by the search area, a first determining step for determining whether a first coordinate of the object or point under consideration defining its location along the width of the strip in which it resides is within the range of the first coordinate of the base point less a distance defining the extent of the search area in a first direction along the width of the strip in which the base point resides and the first coordinate of the base point plus the same distance defining the extent of the search area in the opposite direction along the width of the strip in which the base point resides, whenever it is determined that the first coordinate of the object or point under consideration is within the specified range, a first designating step for designating said object or point as a nearby neighbor candidate, a second determining step for determining if the candidate object or point is in the search area by computing the actual distance between the base point and the candidate object or point and ascertaining if said actual distance is equal to or less than said distance defining the extent of the search area in either direction along the width of the strip, and whenever it is ascertained that said actual distance is equal to or less than said distance defining the extent of the search area in either direction along the width of the strip, a second designating step for designating the candidate object or point as a nearby neighbor of the base point.

2. A process for identifying all nearby neighbor objects and/or points of interest in relation to a user-specified base point having the spherical coordinates ("@ra", "@dec") which resides within a search area of a prescribed radius ("@r") from the base point based on information accessed from a database of geometric data which includes the location of said objects and/or points of interest defined in terms of spherical system with spherical coordinates comprising the declination (dec) and right ascension (ra) of the object or point from the center of a sphere representing the spherical system, comprising:

a dividing step for dividing the sphere into a plurality of zones each forming a declination strip of the same prescribed zone height and assigning an integer zone number to each strip in a bottom to top sequence starting with the south pole being designated as zone number 0;

a first determining step for determining what zone each object or point in the database resides and assigning that zone number to the object or point;

an identifying step for identifying the zone number of every zone intersected by the search area; and for each object or point associated with each zone number identified by the search area, a second determining step for determining whether the ra value of the object or point under consideration is between the range of @ra–@r' and @ra+@r', where @r' is @r corrected for right ascension compression corresponding to the dec value of the base point, whenever it is determined that the ra value of the object or point under consideration is between the range of @ra–@r' and @ra+@r', a first designating step for designating said object or point as a nearby neighbor candidate, a third determining step for determining if the candidate object or point is in the search area by computing the actual distance between the base point and the candidate object or point and ascertaining if said actual distance is equal to or less than @r, and whenever it is ascertained that said actual distance is equal to or less than @r, a second designating step for designating the candidate object or point as a nearby neighbor of the base point.

3. The process of claim 2, wherein the first determining step, comprises:

a declination sum dividing step for dividing the sum of the declination ("dec") of the object or point under consideration in degrees and 90 degrees by the prescribed zone height; and a rounding step for rounding down to the nearest integer value.

4. The process of claim 2, wherein the identifying step, comprises:

a first computing step for computing the zone number of the northernmost zone intersected by the search area by, adding @dec plus 90 degrees plus @r, dividing the resulting sum by the prescribed zone height, and rounding up to the nearest integer value;

a second computing step for computing the zone number of the southernmost zone intersected by the search area by, adding @dec and 90 degrees;

subtracting @r from the resulting sum, dividing the resulting difference by the prescribed zone height, and rounding down to the nearest integer value; and a deeming step for deeming the zone numbers of the northernmost and southernmost zones intersected by the search area, and the zone number of every zone between said northernmost and southernmost zones, as the zone numbers of the zones intersected by the search area.

5. The process of claim 2, wherein the second determining step, comprises a computing step for computing @r' as equal to @r/(cos(abs(dec))+ε)), where E is an arbitrary small number intended to prevent division by zero should the (cos(abs(dec))term equal zero.

6. The process of claim 2, further comprising, prior to performing the first designating step, an elimination step for eliminating the object or point as a nearby neighbor candidate if its dec value is outside a declination range of the search area.

7. The process of claim 2, further comprising, prior to performing the second determining step, a creating step for creating a zone table comprising entries specifying an identity, ra value, dec value and zone number of each object or point in the database, wherein the zone table is used to obtain an object's or point's identity, ra value, dec value and zone number, rather than obtaining these items from the database.

8. The process of claim 7, wherein the creating step comprises an establishing step for establishing primary keys for the identity, ra value and zone number entries to facilitate fast searches.

9. The process of claim 7, further comprising:

a first adding step for adding objects having ra values within a prescribed range ending with 360° into the as a left margin by subtracting 360 from the ra value and assigning the result, which will be a negative number, as the ra value for the margin object or point; and a second adding step for adding 360 to the ra values of objects and points having ra values within a prescribed range starting with 0° and assigning the result, which will be a number greater than or equal to 360° as the ra value for the margin object or point.

10. A process for identifying all nearby neighbor objects and/or points of interest in relation to a user-specified base point having rectangular coordinates which reside within a search area of a prescribed radius (@r) from the base point based on information accessed from a database of geometric data which includes the location of said objects and/or points of interest defined in terms of a planar system with rectangular coordinates (x,y) from a prescribed origin of a plane representing the planar system, comprising:

a dividing step for dividing the plane into a plurality of zones each forming a lateral strip of the same prescribed zone height and assigning an integer zone number to each strip in a bottom to top sequence starting with the bottommost zone being designated as zone number 0;

an assigning step for determining what zone each object or point in the database resides and assigning that zone number to the object or point;

an identifying step for identifying the zone number of every zone intersected by the search area; and for each object or point associated with each zone number identified as intersected by the search area, a first adding step for adding a number equal to the absolute value of the maximum negative x coordinate value associated with the planar system of the database of geometric data to x coordinate values of any object or point taken from the database to produce a corrected x value, a second adding step for adding a number equal to the absolute value of the maximum negative y coordinate value associated with the planar system of the database of geometric data to y coordinate values of any object or point taken from the database to produce a corrected y value, a first determining step for determining whether the corrected x value of the object or point under consideration is between the range of @x−a and @x+a, wherein @x is the x value of the base point corrected by adding a number equal to the absolute value of the maximum negative x coordinate value associated with the planar system of the database of geometric data if the x value of the base point is defined in terms of the planar system of the database, and wherein a is equal to @r whenever the object or point under consideration is in the same zone as the base point and to one half the width of the widest portion of the search area that intersects the zone containing the object or point under consideration whenever that object or point is not in the same zone as the base point, whenever it is determined that the corrected x value of the object or point under consideration is between the range of @x−a and @x+a, a first designating step for designating said object or point as a nearby neighbor candidate, a second determining step for determining if the candidate object or point is in the search area by computing the actual distance between the base point and the candidate object or point and ascertaining if said actual distance is equal to or less than @r, and whenever it is ascertained that said actual distance is equal to or less than @r, a second designating step for designating the candidate object or point as a nearby neighbor of the base point.

* * * * *